US006438704B1

(12) United States Patent
Harris et al.

(10) Patent No.: US 6,438,704 B1
(45) Date of Patent: Aug. 20, 2002

(54) SYSTEM AND METHOD FOR SCHEDULING USE OF SYSTEM RESOURCES AMONG A PLURALITY OF LIMITED USERS

(75) Inventors: John F. Harris; Mark J. Lorenc, both of Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,525

(22) Filed: Mar. 25, 1999

(51) Int. Cl.[7] .................................................. G06F 1/14
(52) U.S. Cl. ...................... 713/502; 713/600; 709/102; 710/58
(58) Field of Search .................. 713/502, 501, 713/503, 400, 401, 650, 601, 600; 712/28, 203; 709/101, 102, 103, 104, 107; 710/58

(56) References Cited

U.S. PATENT DOCUMENTS

| | | | |
|---|---|---|---|
| 4,183,083 A | | 1/1980 | Chatfield ..................... 364/200 |
| 4,388,688 A | | 6/1983 | Curlee, III et al. .......... 364/200 |
| 4,481,583 A | | 11/1984 | Mueller ....................... 364/300 |
| 4,551,812 A | | 11/1985 | Gurr et al. ................... 364/492 |
| 4,631,674 A | | 12/1986 | Blandy ........................ 364/300 |
| 4,736,318 A | | 4/1988 | Delyani et al. ............. 364/200 |
| 4,989,133 A | | 1/1991 | May et al. ................... 364/200 |
| 5,193,187 A | | 3/1993 | Strout, II et al. ........... 395/650 |
| 5,291,599 A | | 3/1994 | Cohen et al. ................ 395/700 |
| 5,325,525 A | * | 6/1994 | Shan et al. .................. 395/650 |
| 5,375,202 A | * | 12/1994 | May et al. ................... 395/164 |
| 5,463,775 A | | 10/1995 | Dewitt et al. ........... 395/184.01 |
| 5,517,643 A | * | 5/1996 | Davy .......................... 395/650 |
| 5,564,015 A | | 10/1996 | Bunnell .................. 395/184.01 |
| 5,615,121 A | * | 3/1997 | Babayev et al. ................ 705/9 |
| 5,623,404 A | * | 4/1997 | Collins et al. .................. 705/9 |
| 5,668,942 A | * | 9/1997 | Fromherz ................... 358/1.13 |
| 5,774,718 A | | 6/1998 | Aoshima et al. ............ 395/670 |
| 5,987,492 A | * | 11/1999 | Yue ............................ 709/102 |
| 6,108,683 A | * | 8/2000 | Kamada et al. ............. 709/103 |

FOREIGN PATENT DOCUMENTS

GB            2236880           4/1991

OTHER PUBLICATIONS

IBM TDB Sep. 1986 p. 1834.
Tokuda et al, An Integrated Time–Driven Scheduler for the ARTS Kernal, Comp & Comm., 1989 International Phoenix Conference, 1989 pp. 486–496.

* cited by examiner

Primary Examiner—Jeffrey Gaffin
Assistant Examiner—RiJue Mai
(74) Attorney, Agent, or Firm—Shelley M Beckstrand

(57) ABSTRACT

A computer system allocates processor time to multiple users. A systems operator or other administrator specifies to the computer a share of processor time for each user. A particular user's CPU usage is limited to an absolute value in a 'dispatch driven' multiprocessing system through the use of a monitor built into an active wait routine. The mechanism used is a list of users whose CPU resource must be limited so that their consumption does not exceed the limit value. The limit list is active wait monitored to determine when a user should be removed from the list in a low load situation and thus deliver the maximum CPU usage to the user if it is available.

14 Claims, 8 Drawing Sheets

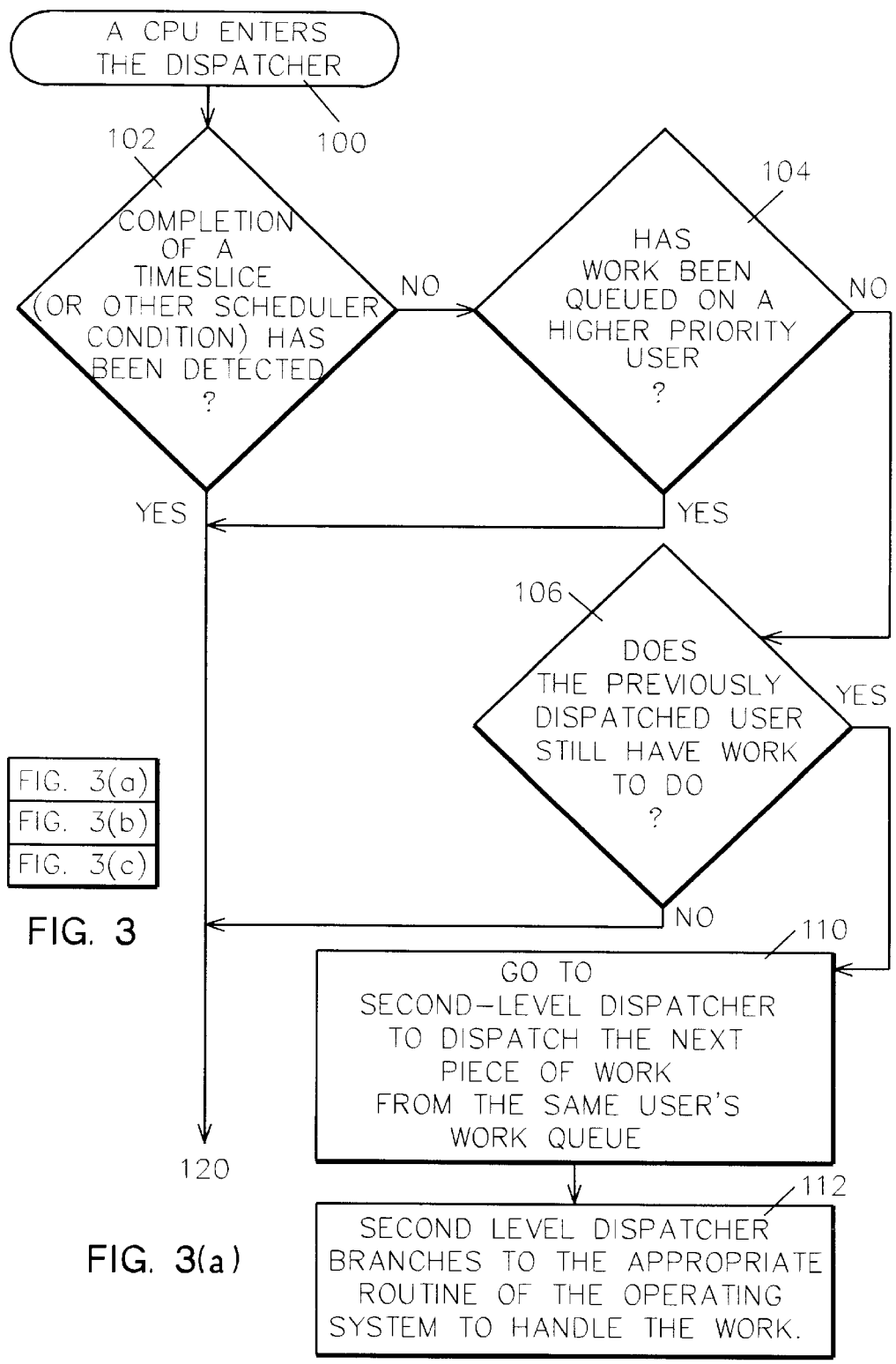

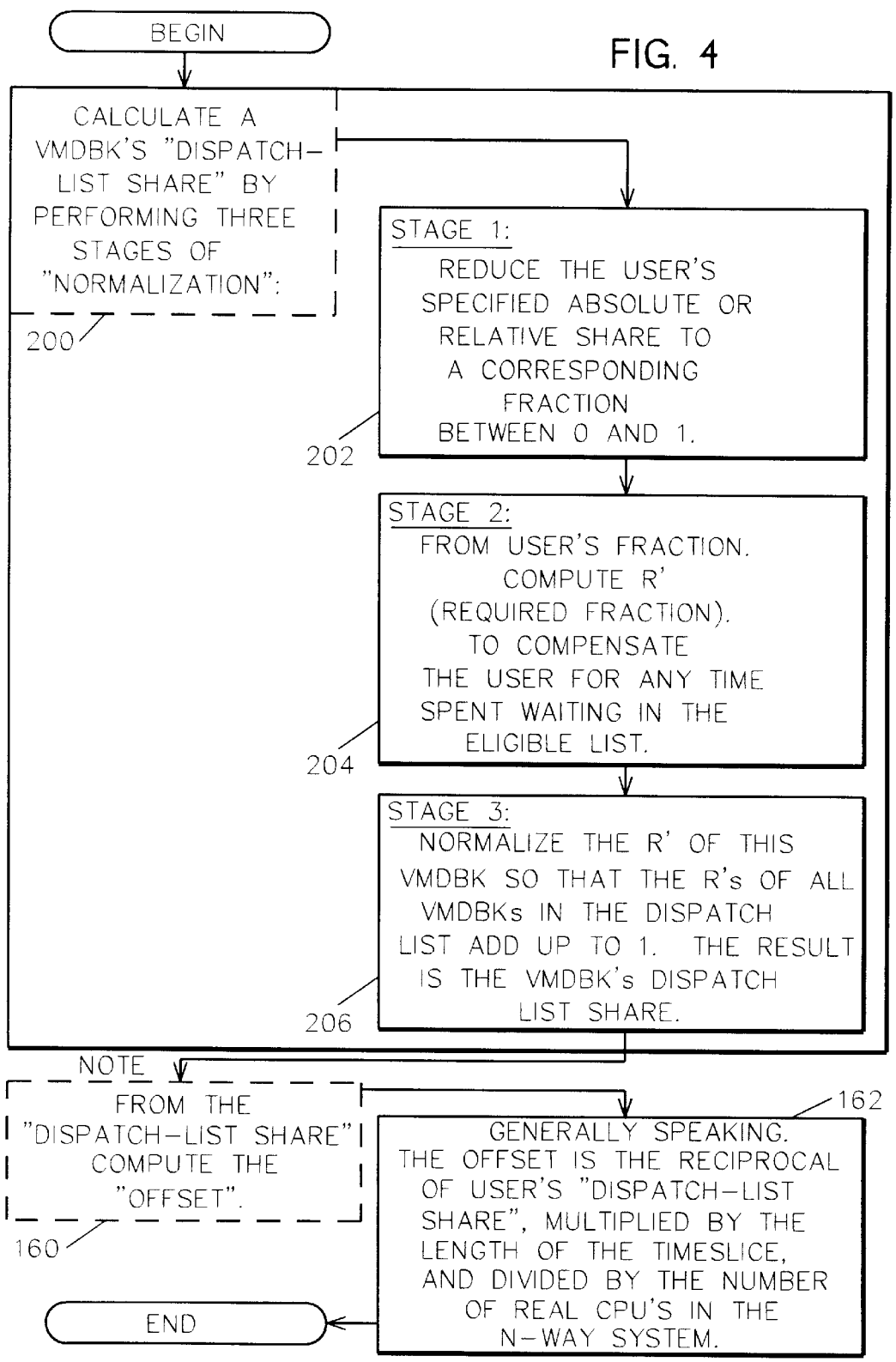

SYSTEM AND METHOD FOR SCHEDULING USE OF SYSTEM RESOURCES AMONG A PLURALITY OF LIMITED USERS

BACKGROUND OF THE INVENTION

1. Technical Field of the Invention

This invention pertains to a system scheduler. More particularly, it relates to scheduling to users the resources to which they are entitled in a dispatch driven multiprocessor system.

2. Background Art

Schedulers are provided in operating systems to control the amount of system resources consumed by users. Co-pending U.S. patent application, Ser. No. 08/252,864 filed Jun. 2, 1994 by G. A. Davison describes such a system.

Often in a computer system, many programs or users require execution concurrently. There may be one or more processors available to execute the multiple programs. Any one processor can only execute one program or transaction at any one time. If two or more programs request execution at the same time, and there is only one processor or fewer processors than the number of programs requiring execution, the operating system must determine which program can use the one or each processor at any one time. Typically this decision is based on a relative priority of each of the programs. Typically also, programs which are in a wait state, such as those waiting for a slow I/O operation to complete, are "suspended" and therefore not eligible to compete for the processor regardless of their priority.

In addition to deciding which program can utilize the one or each processor at a particular time, the operating system must also determine how long the selected program can utilize the respective processor after it begins to execute so that other programs of equal (or perhaps lower) priority can get their turn. There are several known techniques for determining how long each program should be permitted to utilize a processor after it begins to execute. In the simplest technique, the highest priority program maintains its use of the processor until completion (or suspension). However, this may permit this program to "hog" the processor, and "starve" the other programs. In another known technique, each program which is selected for execution is given a share or "slice" of the total processor time. The shares of the programs can be equal or preferably weighted based on various factors. One known technique to weight the shares is as follows. Some of programs are defined to command an "absolute" or definite share of the total processor time, and others are defined to command a "relative" share of the remaining processor time. The absolute shares are "taken off the top" and the relative shares divide the remainder in proportion to their relative shares. For example, a first program is defined with a forty percent absolute share, a second program is defined with a one hundred relative share and a third program is defined with a three hundred relative share. In this scenario, the first program will command forty percent of the total processor time, the second program will command fifteen percent of the total processor time and the third program will command forty five percent of the total processor time.

A program may not need its entire absolute or relative share. A known technique to allocate the excess in this absolute/relative share environment is to give all the excess to the program with the highest absolute or relative share. If the excess were a small percentage of the total processor time, this known technique would suffice. However, in many cases, the excess is substantial, such as one half of the total processor time, and it may not be optimum to allocate all the excess to one program.

The relative share of the system that a user is entitled to is based on a proportion of the priorities of all the relative share users who are presently competing for system resources. However, all of the system resources are not necessarily available to the relative share users. If there are absolute share users competing for resources, those absolute share users are given their part of the system first before the remaining share of the system is divided proportionally among the relative share users. These relationships may be represented, generally, as follows:

remaining share=100% of the system−total of all absolute shares

Then the remaining share is divided proportionally among the relative share users:

relative user's share=remaining share*(user's relative share/total share of all relative users)

A minor time slice is the amount of processor time that a given user is allowed to have without interruption for reexamination by the scheduler. The size of a minor time slice is dependent on machine speed and possibly customer setting. When a user is dispatched, a CPU timer is set with the amount of time in a minor time slice. This timer decrements and presents an interrupt when it runs out, thus signaling to the scheduler that the user's minor time slice has ended.

A limited user, i.e., 'limithard' user, is one for which a limit value is defined representing the maximum amount of processor resource to which it is entitled. This limit value represents a maximum usage share, and is used to calculate the dispatch priority for the user. Typically, a limit list is provided on which are placed those limithard users which exceed or are about to exceed their maximum allowed share of the processor resource. While a user is on the limit list (or otherwise characterized by a limit status), resources are not dispatched for its use.

An artificial time-of-day (ATOD) clock is used in dispatching user work. The ATOD value increases at the same rate as the machine's time-of-day (TOD) clock but only during the time that user work (as distinguished from non-user work, such as operating system work) is being done by the machine. In current systems which rely, at least in part, on ATOD to schedule systems resources, a limited share user may not be allowed to achieve its maximum usage share even when CPU resource is available. Apparently, in a low load situation with idle processor resource time, the artificial time-of-day (ATOD) value does not move fast enough during the idle time. Therefore, dispatching priorities of those limithard users that are running move faster than they should relative to ATOD and they enter the limit list (that is, given limit status) prematurely. Furthermore, users may be unnecessarily retained on the limit list because only active (non-idle) processors monitor the list. In a low load situation (a time when there is not enough work to keep all the processors busy), fewer processors are active so the limit list is monitored less frequently. This creates an increase in the time between when a user should leave the limit list and when a processor detects that it should leave. Heretofore, there has been no mechanism to remove this user from the limit list during the time that a processor is in the active wait state. In this situation, there is time when processors have no user work to do and are therefore looping in the active wait mechanism, and a user on the limit list remains there until something happens on another processor that would cause the limit list to be checked.

Thus, when a current system such as that described in Davison, supra, has very few users on it, or when it is not busy, its scheduler gives users less CPU time than their hard limits when they should be able to have usage up to the hard limit. In a case where there are very few users on the computer system, oddly enough the user gets noticeably less CPU time, up to 20% less, than entitled. This may result, particularly where CPU time is sold, in complaints from users that they are not getting all of the CPU time for which they are paying. Conversely, CPU time may not be charged when it could be.

It is an object of the invention to provide a scheduler system and method to facilitate allowing a user access to system resources closely approaching or equal to its hard limit in a low load situation.

It is a further object of the invention to provide an improved scheduler which facilitates optimal charging for system resources and reduces user discomfort over the amount of the charges or the availability of such resources.

It is a further object of the invention to provide a system and method whereby a monitor built into an active wait routine is used by system scheduling algorithms to determine a user's priority and to determine which user should be allowed to run next.

It is a further object of the invention to provide a system and method for scheduling system resources to users having limited access by placing such users on a limit list not too soon, and removing them from the limit list not too late.

It is a further object of the invention to provide a system and method for scheduling system resources to users having limited access by enabling scheduling of resources not too late and inhibiting scheduling of resources not too soon.

SUMMARY OF THE INVENTION

System resources are scheduled for use by a user by maintaining a first clock; maintaining a second clock; during a dispatch process, if there is work to do, scheduling use of system resources to the user in dispatch priority order with other users only when the user is not in wait status; otherwise advancing the first clock by user time; and advancing the second clock by user time and wait time; and during a wait process, if there is work to do, calling the dispatch process; otherwise, timing wait time; and if there is a user in wait status upon the wait time exceeding a predetermined value, incrementing the first clock by the wait time and calling the dispatch process.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4 is a flow chart of (a small portion of) a scheduler within the operating system of FIG. 2.

BEST MODE FOR CARRYING OUT THE INVENTION

In accordance with the preferred embodiment of the invention, which is an improvement upon the system described in co-pending patent application Ser. No. 08/252, 864, supra, an operating system schedules system resources to users having limited access by placing such users on a limit list not too soon, and removing them from the limit list not too late.

Thus, a system and method is provided for limiting a particular user's CPU usage to an absolute value in a 'dispatch driven' multiprocessing system through the use of a monitor built into an active wait routine. The mechanism used is a list of users whose CPU resource must be limited so that their consumption does not exceed the limit value. Such users are characterized as having a 'limit status'. The limit list is active wait monitored to determine when a user should be removed from the list (hence restored to 'dispatch status') in a low load situation and thus deliver the maximum CPU usage to the user if it is available. In accordance with the preferred embodiment of the present invention, this active wait routine (also referred to as a process, or a procedure) monitors the users on the limit list to determine when it is time to call a dispatch routine to remove them from the list, using performance data monitored and fed back to dynamically adjust the scheduling routine to enhance its effectiveness in determining a user's priority and in determining which user should be allowed to run (dispatched) next. A user is removed from the limit list by the dispatch routine when ATOD2 is calculated to be within one minor time slice of the user's limit list priority.

Users tasks are scheduled to run in accordance with a dispatch priority value representing the end of a user's time slice. This value is in time-of-day (TOD) format, and is further described hereafter.

Figure 1:
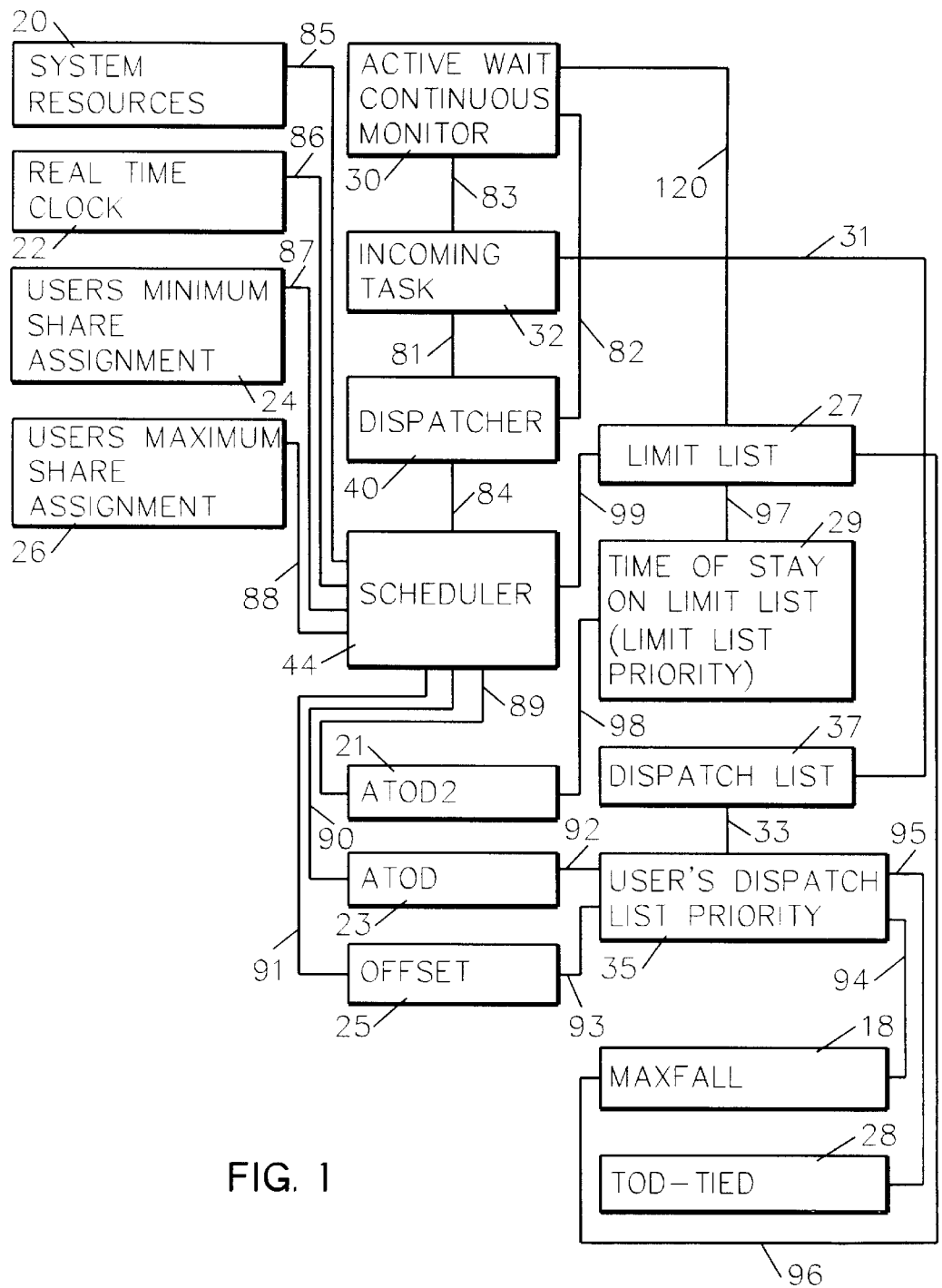
FIG. 1 is a system diagram of the method and data structures implementing the preferred embodiment of the invention.

Referring to FIG. 1, a system diagram illustrates the programming (data and method) structures of the preferred embodiment of the invention. These programming structures include system resources 20, real time clock 22, users minimum share assignment 24, users maximum share assignment 26, active wait continuous monitor 30, incoming task 32, dispatcher 40, scheduler 44, ATOD2 21, ATOD 23, offset 25, limit list 27, duration of stay (also referred to as time of stay) on limit list 29, user's priority boundary 35, dispatch list 37, maxfall 18, and TOD-TIED 28. The linkages between these structures implement the preferred embodiment of the method of the invention, as will be explained hereafter.

Referring again to FIG. 1, in operation, as is represented by line 81, dispatcher 40 looks for incoming work 32 and lets it run based on the priority set by scheduler 44 if there is some work to do. As is represented by line 82, if there is no work to do, dispatcher 40 calls active wait continuous monitor 30. As is represented by line 83, active wait process 30 continuously monitors the system for any incoming work 32 and as is further represented by line 82, calls dispatcher 40 to run it when some arrives. As is represented by line 84, dispatcher 40 calls scheduler 44 to recalculate the user's dispatch priority when a user reaches the end of a minor time slice. As is represented by lines 85, 86, 87 and 88, respectively, scheduler 44 uses as input to the dispatch priority calculation system resources 20, real clock time 22, user's minimum share assignment 24, and user's maximum share assignment 26. As is represented by line 89, scheduler 44 updates ATOD2 21 by advancing ATOD2 by the amount of CPU time used for actually running users plus any wait time (when no work was available to run) since the last time ATOD2 was updated. As is represented by line 90, scheduler 44 updates ATOD 23 by advancing ATOD by the amount of CPU time used for actually running users since the last time ATOD was updated and under certain circumstances essential to the invention also by wait time. The updated ATOD previous ATOD plus the user CPU time since the last time ATOD was recalculated. As is represented by line 91, scheduler 44 calculates an offset 25 for the user which will be used in the priority calculation. Offset 25 is used as a displacement from the current ATOD 23 value when the user's dispatch priority 35 is calculated. As is represented by lines 92 and 93, user's dispatch list priority 35 (also referred to as the deadline priority or predicted completion time) is set based on the scheduler's 44 calculations and within boundaries based on the current ATOD 23 value and the size of the user's offset 25. As is represented by lines 31 and 33, user's dispatch list priority 35 is used to place a user's work on dispatch list 37 in prioritized order with other work so that dispatcher 40 sees it as incoming task 32 which needs to be run. Scheduler 44 uses ATOD 23 to calculate the user's dispatch list priority 35 in order to put the user on dispatch list 37 and uses ATOD2 21 to calculate the limit list 27 priority when the user's resource consumption needs to be limited by placing it on limit list 27. As is represented by line 95, the upper boundary calculated is called TOD-TIED 28. As is represented by line 94, the lower boundary calculated is called maxfall 18. As is represented by line 96, a limited share user whose dispatch priority 35 is calculated by the scheduler to be outside of the maxfall boundary 18 is added to limit list 27. As is represented by lines 97 and 98, a prediction of the duration of stay 29 on limit list 27 is made based on ATOD2 21. As is represented by line 99, the user stays on limit list 27 until it is time to be removed by scheduler 44. As is represented by line 120, in a low load situation, active wait process 30 monitors limit list 27 to determine when a user may have to be removed.

The calculations required for determining ATOD, TOD-TIED, dispatch priority and offset, and their use in scheduling resources to users are described hereafter. The equation for calculating maxfall is:

$$\text{maxfall} = ATOD + 4 * \text{offset}$$

the equation for calculating offset is:

$$\text{offset} = (\text{minor\_time\_slice\_overrun}) / (\text{number\_of\_cpus} * \text{share})$$

where overrun=the amount of time remaining on the user's previous minor time slice if the user had been preempted by higher priority work.

A user's dispatch priority is an integer value calculated within the bounds of the priority boundaries maxfall and TOD-TIED. A more complete explanation of the TOD-TIED mechanism is provided hereafter.

ATOD 23 and ATOD2 21 are data structures (fields) used to accumulate the user time of all the users on the system and the wait time of the system as a whole. Individual user time and/or wait time need not be tracked. These accumulations are used in predicting certain events to occur, such as the end of a user's minor time slice, as compared to the activity of the system.

FIGS. 2–5, and the following description of them, is adapted from co-pending application Ser. No. 08/252,864 by Davison, and constitutes a tutorial of basic concepts essential to an understanding of the present invention, which is primarily an improvement on the mechanism provided for adjusting ATOD and ATOD2 to include wait time in such a manner as to substantially improve upon the objective of not adding a user to the limit list too soon or removing that user too late.

Figure 2:
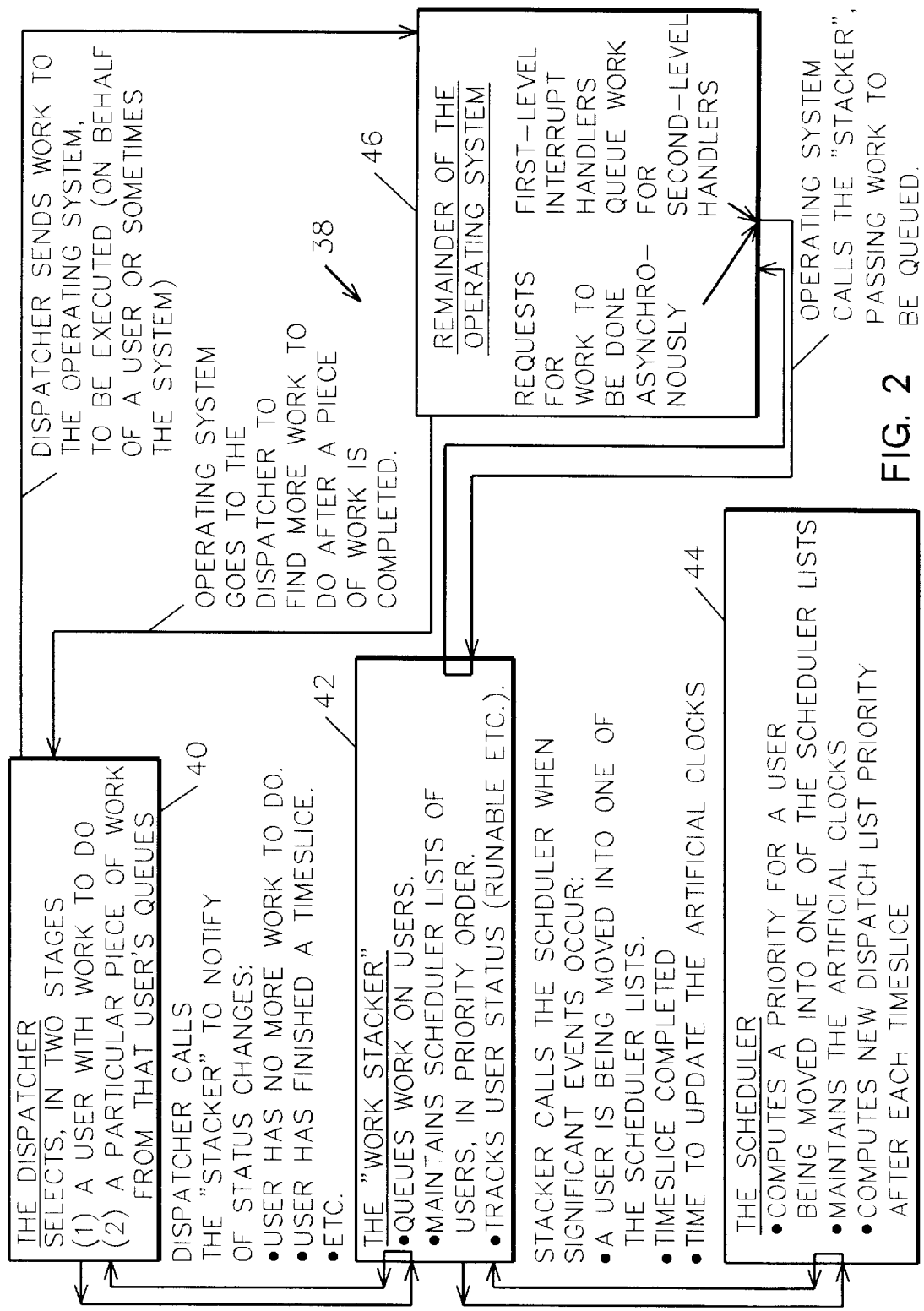
FIG. 2 is a flow diagram of computer operating system.

FIG. 2 illustrates that an operating system 38 comprises a dispatcher 40, stacker 42, scheduler 44 and remaining functions 46. The stacker is the interface between the scheduler and the dispatcher and between the dispatcher and scheduler and the remainder of the operating system. The following is a high level description of the flow of processing. In a typical scenario, a user makes a request to the operating system "remainder" 46 to perform some work. The work request is passed to the stacker 42 which records the status of the user as "ready". The stacker views the work arriving from the user as one or more "transactions" even though the user may have a different view of its work. A "new" transaction begins when a user goes from a state of total idleness ("idle") to a state of being ready to execute ("ready"). There is also a third state of "suspension" which exists when a user still has work (a transaction) in progress, but is waiting for a virtual I/O request to complete and therefore is temporarily not ready to execute. Periods of suspension are not sufficient grounds to declare a new transaction. Next, the stacker passes the request to a work queue for this user. The stacker also calls the scheduler to obtain information indicating the dispatch priority 35 of this user in relation to other users on the dispatch list 37. Then, the stacker places this user (actually the user's VMDBK) in dispatch list 37 and returns to the "remainder" of the operating system. The dispatch priority effects the ordering of users on the dispatch list. When the remainder of the operating system completes its current piece of work, it transfers control to dispatcher 40 to determine the next user and piece of work to execute. The dispatcher then selects the first, ready user in the dispatch list 37 and the first piece of work in the user's work queue to be dispatched next. Then, dispatcher 40 transfers control to the remainder of the operating system to begin executing this work. The dispatched work is then executed for a time slice of predetermined duration, for example, one millisecond. If the work item completes before the one millisecond time slice ends, the dispatcher selects another piece of work from the work queue of the same user to execute. At the end of this time slice, if the user still has work to do, the dispatcher calls scheduler 44 again to obtain a new priority for the next time slice for this user. This new priority causes the user to be repositioned in the dispatch list, which in turn determines when this next time slice begins for the same user. The time between successive time slices for the same user determines in part the share of processor time for this user.

All users are dispatched and executed for discrete time slices of uniform duration, regardless of their absolute or relative shares. In the foregoing example, each time slice is one millisecond. A time slice is generally based on the speed of the processor, and the one millisecond selected for this embodiment is merely an example, and may be overridden to tune the system. After each user (represented by a VMDBK) completes a time slice, it is interrupted and moved downwardly in the dispatch list (re-prioritized). This generally permits another user to use this processor. Each user's share of the processor is determined by the interval between the time slices allocated to the user and the time required for the user to utilize each time slice; each user does not necessarily consume a single time slice in one continuous millisecond. If the user must wait for an I/O operation, it is temporarily suspended and taken off the processor (but remains in dispatch list 37) so that the time waiting for the I/O operation to complete does not count toward this user's time slice. For example, even though an I/O operation may require several milliseconds to complete, an I/O-bound user will often be able to initiate and wait for completion of ten or more I/O operations before using up a single time slice. Also, if work arrives for another user with higher priority, the dispatcher may remove an executing user from its process before the end of the user's time slice and suspend it for a period. The operating system can control the actual share of processor time of each user by controlling the interval between time slices. The interval between time slices for a user corresponds inversely to the magnitude of the share of the user in dispatch list 37 compared to those of other users in the dispatch list from moment to moment. Each time a VMDBK completes a time slice, only that one VMDBK is re-prioritized and re-positioned in dispatch list 37. In the cases where a single time slice is used in pieces, the scheduler does not recompute the user's interval between time slices until the accumulated time equals the one millisecond time slice. The technique for determining the nominal interval between time slices is described in more detail below.

Each CPU in the N-way MP system has a time-of-day (TOD) clock 22 and a CPU timer. The TOD clock comprises a fifty-two bit hardware register which is incremented once every microsecond. The TOD clock is set when the operating system is initialized (booted) and is never altered after that. On an N-way MP system, all N of the TOD clocks are synchronized with each other exactly to the microsecond. The TOD clock is set such that time zero is midnight on Jan. 1, 1900. With a 52-bit TOD clock (i.e., bits 0–51) counting microseconds, the clock can run for over 140 years before it repeats. The TOD clock never stops, and always increases and is a reliable and accurate time stamp and measure of real time.

The CPU timer comprises another fifty-two bit hardware register which is used by the operating system 38 for timing each time slice. The CPU timer stops running if and when the system operator stops the CPU, and it starts again as soon as the operator restarts the CPU (whereas the TOD clock runs continuously). The advance of the CPU timer and time slice resumes when the CPU is started up again. When each user begins its time slice, the starting time is noted from the CPU timer. Similarly, each time the user becomes suspended, the time of the CPU timer is noted to determine how much of the time slice remains for this user when it executes again. Thus, the user being processed when the CPU stops, and being measured against the CPU timer, does not lose any of its time slice entitlement.

The scheduler also has a software clock known as the artificial time-of-day (ATOD) clock (and also a second artificial time-of-day clock ATOD2 described later). The ATOD clock is similar to the hardware TOD clocks, except that there is only one (not one per CPU) and it runs slightly slower. A certain amount of the total available processing power of the CPU is expended on operating system overhead which cannot be attributed to any particular user. Therefore, this amount of the total processing time is unavailable to be divided up as users' shares. The percentage of the total processing that is system overhead varies from moment-to-moment, making it difficult to know how much less than 100% is available for users' shares. This difficulty is circumvented by defining the ATOD clock to be stopped while the operating system is performing overhead functions, and then using ATOD time rather than TOD time in the calculations that deliver shares to users. In the ATOD clock then, time stops while overhead is performed. Thus, 100% of the time measured by the ATOD clock corresponds to usable processing. The calculations for delivering shares, being based on the ATOD clock, can therefore calculate as if 100% of the processing is available for users' shares.

In operating system 38, the lower the priority number the higher the actual priority. Priority numbers are ever changing for each user and dispatch order is based on the relative priority numbers between the ready users. Priority numbers are computed by the scheduler based on the respective absolute or relative share when a user/VMDBK is put in dispatch list 37. When computed for a user just entering the dispatch list, the priority number typically is slightly larger (by a few milliseconds) than the current value of the ATOD clock. (However, in actuality, for the first few time slices, a smaller priority number is used to provide a quick response for the user in cases of very short transactions. This alteration is so short as to not materially affect users' shares.) Because ATOD always advances, older, uncompleted tasks usually have a lower priority number and therefore a higher priority than newer tasks, and tend to be located near the top of the dispatch list. As described in more detail below, the dispatcher searches from the top downwardly on the run list (which is a copy of the dispatch list 37 excluding non-ready or suspended users and thus is a collection or list of users having run status) to locate a user to execute. As time advances, if a user does not get dispatched because of higher priority ready tasks, or if the user gets dispatched but is I/O bound and spends much time "suspended" without completing its time slice, then the user's priority increases relative to (1) users starting transactions more recently and (2) users who are not as I/O-bound. These two things are true, respectively, because (1) the user's priority number remains fixed until its time slice is completed whereas other users starting new transactions are assigned progressively higher priority numbers as ATOD increases and (2) the more CPU bound users use many time slices and are moved downwardly after each one. Thus, the I/O bound users tend to have higher relative priorities than non-I/O bound users and generally, are positioned near the top of the dispatch and run list and are quickly provided with a CPU when ready to execute, i.e. after each I/O operation completes.

For each user, there is an absolute or relative share 24, 26 (specified in the system directory and sometimes altered by the system operator). For each user there is also a specified "soft limit", "hard limit" or "no limit". As unused processing time becomes available, all users begin to receive excess processing time in proportion to their absolute shares and relative shares computed as if there was no unused processing time. However, when any hard limit user reaches its hard limit, no further allocation is made. No hard limit user can ever be allocated a share of processing time which exceeds the hard limit. When any soft limit user reaches its soft limit, no further allocation is made to this soft limit user if any other soft limit user has yet to reach its soft limit or any other hard limit user has yet to reach its hard limit or if there are any unlimited users capable of using the excess processing time. The other soft limit and hard limit users who have not yet reached their limits continue to receive extra shares until they also reach their respective limits. When all other soft limit users have reached their soft limits and all hard limit users have reached their hard limits and if there are no unlimited users capable of using the excess processing time, then the soft limit user with the greatest absolute share or relative share (computed as if there was no unused processing time) receives all the remaining unused processing time. Alternatively, when all soft limit users have reached their soft limits and all hard limit users have reached their hard limits and if there are no unlimited users capable of using the excess processing time, then all soft limit users share the remaining unused processing time in proportion to their absolute shares or relative shares computed as if there was no unused processing time.

As described in more detail below, the share allocation technique is implemented by re-positioning or offsetting each user downward in the dispatch list after the user completes each time slice. The amount of offset is based on the magnitude of the absolute or relative share. The relative amount of I/O boundness of each user is taken into account when repositioning the user in the dispatch list after completing a time slice by starting the offset from the position of the user just before completing the time slice. Thus, if the user is very I/O bound, it will be located very near the top of the dispatch list before completing its time slice, and therefore will be repositioned high in the dispatch list even after completing the time slice and undergoing the downward offset. (When a user first enters the dispatch list, the offset is started from the vicinity of ATOD.)

Figure 3B:
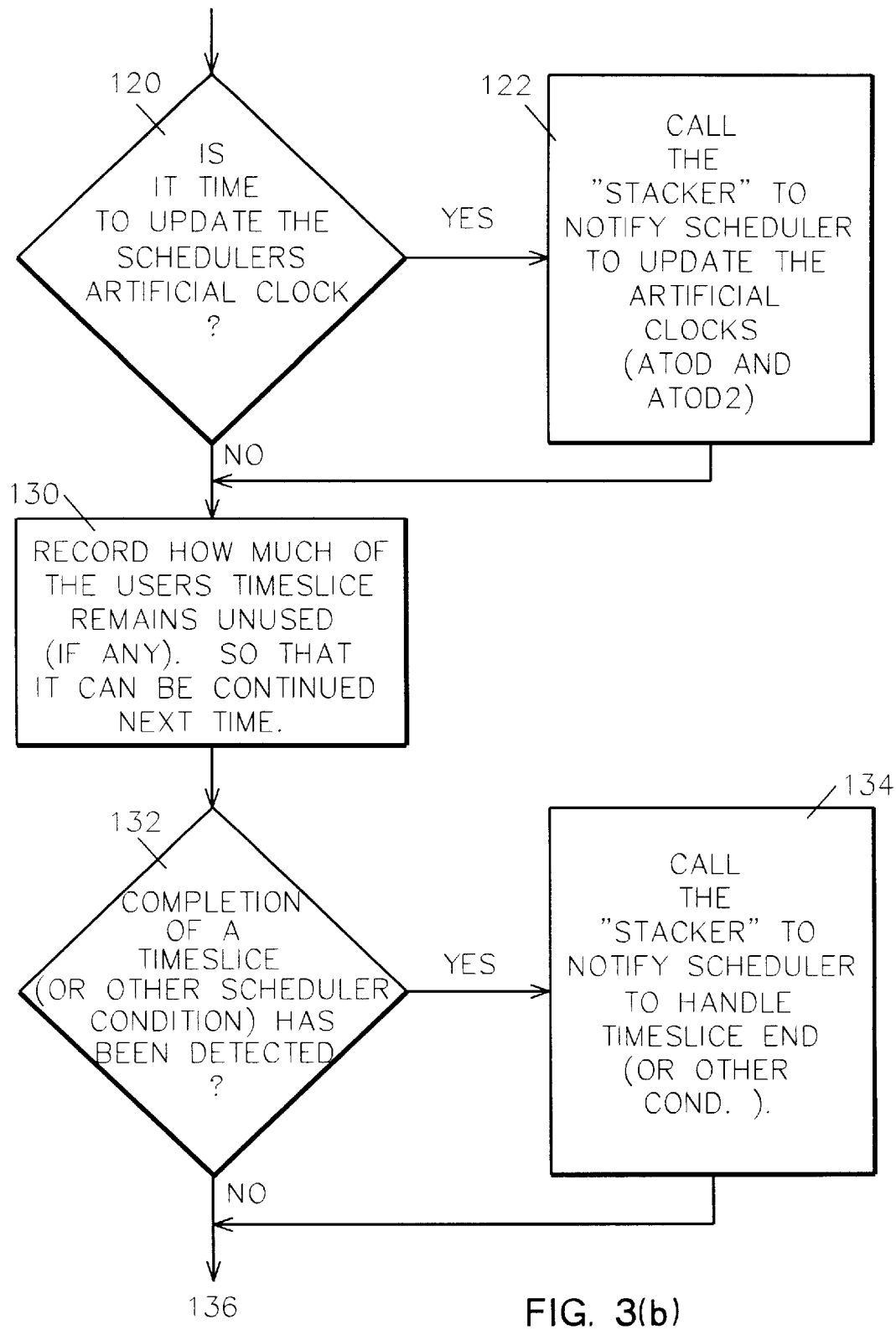
FIGS. 3(a–c) form a flow chart of a dispatcher.
Figure 3C:
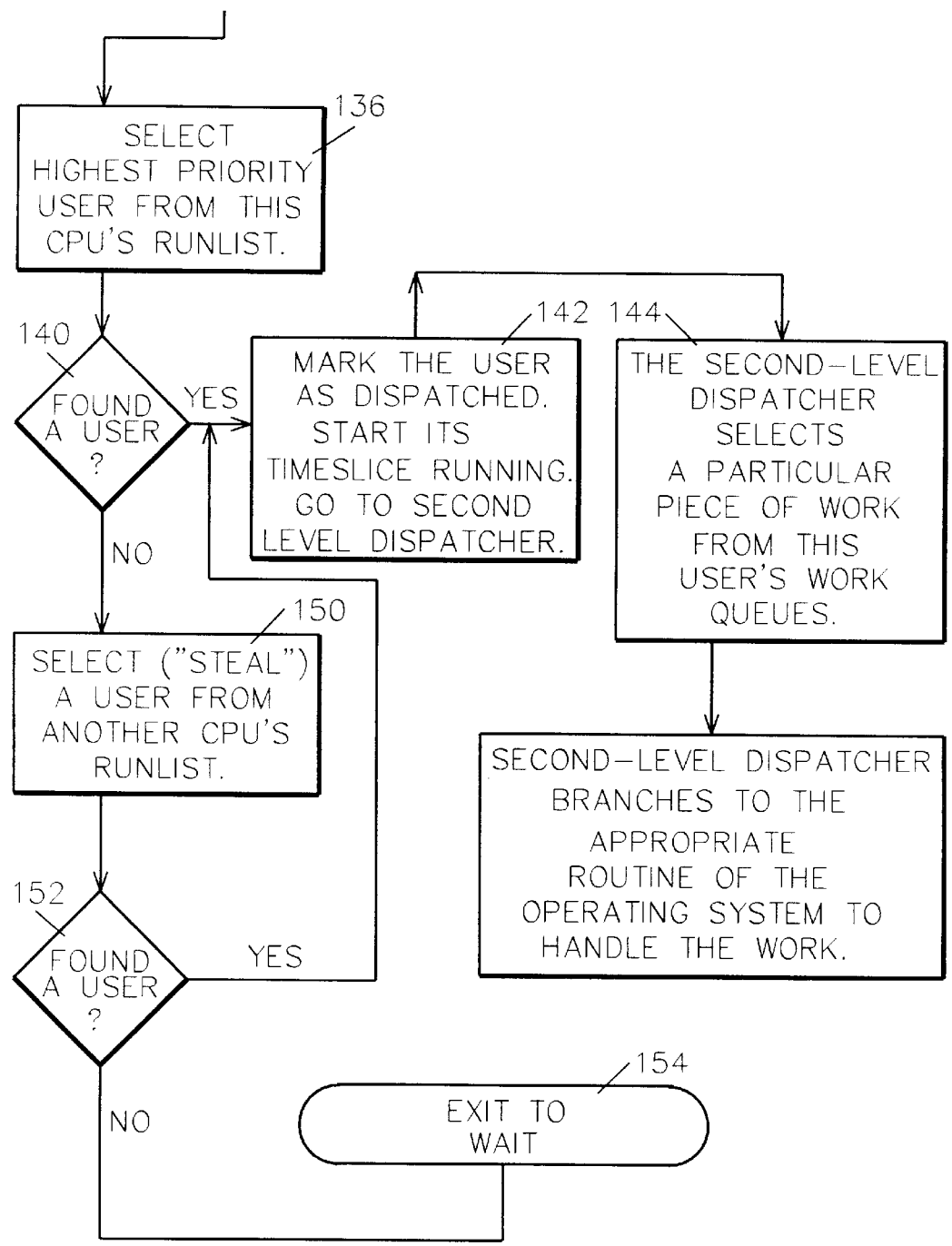

Dispatcher 40 is implemented as illustrated in FIGS. 3(a–c). In step 100, a CPU completes execution of a piece of work for a user and so notifies the dispatcher. In response, the first level of the dispatcher determines if the user has completed its current one millisecond time slice (decision 102). If not, then the first level dispatcher determines if a higher priority user is waiting for the processor (decision 104). If not, then the first level dispatcher determines if the user that just completed one piece of work has another piece of work to perform, i.e. another piece of work in its work queue (decision 106). If so, then the first level dispatcher calls the second level of the dispatcher to dispatch the next piece of work from this user's queue for execution on the same CPU that just completed the other piece of work for this same user (step 110). In response, the second level dispatcher selects the first piece of work on this user's work queue and transfers control to the appropriate routine in the operating system for handling this particular piece of work (step 112).

Referring again to decisions 102, 104 and 106, if decision 102 is yes, decision 104 is yes or decision 106 is no, then the first level dispatcher proceeds to decision 120 to determine if it is time to update the scheduler's ATOD clock (and ATOD2 clock) as described below. This decision is based on whether or not at least one millisecond has elapsed since the last update of the clocks. If so, the dispatcher calls the stacker to notify the scheduler to update the ATOD and ATOD2 clocks (step 122). Next, the first level dispatcher "undispatches" the user by first recording how much, if any, of the user's time slice remains unused (step 130). If decision 102 lead to step 130, then nothing of this time slice remains. However, if step 130 was preceded by either decision 104 or decision 106 then some amount of the time slice remains. Next, the first level dispatcher determines if the time slice has been completed (and any of several other scheduler conditions such as whether the user should be cycled back to the eligible list are checked) (decision 132). If so, the first level dispatcher calls the stacker to notify the scheduler to handle the end of time slice or other scheduler condition (step 134). Next, the first level dispatcher selects the highest priority user from the run list of the CPU that just completed execution of the transaction (step 136). If there is such a user (decision 140), then the first level dispatcher marks this user as dispatched, loads the time slice (or remainder thereof) into the CPU timer in order to time the time slice for this user and then goes to the second level dispatcher (step 142). In response, the second level dispatcher selects the first piece of work for this user from the user's work queue and transfers control to the appropriate routine in the operating system portion 46 for handling this particular piece of work (step 144).

Referring again to decision 140, if no user was found for the CPU that just completed execution of the transaction, the first level dispatcher selects the highest priority user from another CPU's run list (step 150). If such a user is found (decision 152), the first level dispatcher proceeds to step 142 to dispatch this user from the other CPU's run list. However, if no such user is found on another CPU's run list, then the first level dispatcher proceeds to a wait state (step 154).

FIG. 4 illustrates a portion of the scheduler 44. After receiving from the second level dispatcher (via the stacker) the identification of the new user to be scheduled, the scheduler determines a "dispatch list share" (step 200) as follows. In step 202, the scheduler converts the user's absolute or relative share to a fraction of the system's processing time in the manner described above for the prior art VM/ESA operating system i.e. all absolute shares are taken off the top (and reduced proportionally if the total is greater than ninety nine percent) and the remainder is divided amongst the other users on the dispatch list in proportion to their relative shares. The result for each user is a fraction of the processor time (between zero and one) and the values of all user's add to one. Next, the scheduler determines this user's "required fraction" (R') in order to compensate the user for any time spent waiting in an "eligible" list (step 204). A user is put in the eligible list when it is ready to execute, but there is insufficient memory available to execute the user's work. The required fraction is determined by multiplying the share fraction determined in step 202 by (time in dispatch list+time in eligible list)/(time in dispatch list). The required fraction for each user is recomputed after each stay in the eligible list and the result is used for the next period in the dispatch list. However, usually there is sufficient memory for all users so the "trips" to the eligible list are rare and usually, step 204 is a simple multiplication of the result of step 202 by one. Next, the scheduler normalizes the required fraction R' of this user so that the required fractions of all users in the dispatch list add to one (step 206). The user's normalized required fraction is the "dispatch list share" (or run list share) and is described in more detail below. From the dispatch list share for this user, the scheduler determines an "offset" down the dispatch list and run list. Roughly, the user's offset is the reciprocal of the dispatch list share multiplied by the length of the time slice and divided by the number of real CPUs. in the system. The smaller the offset the more access the user has to a CPU, and vice versa. The precise value of the user's offset is described in more detail below.

Figure 5:
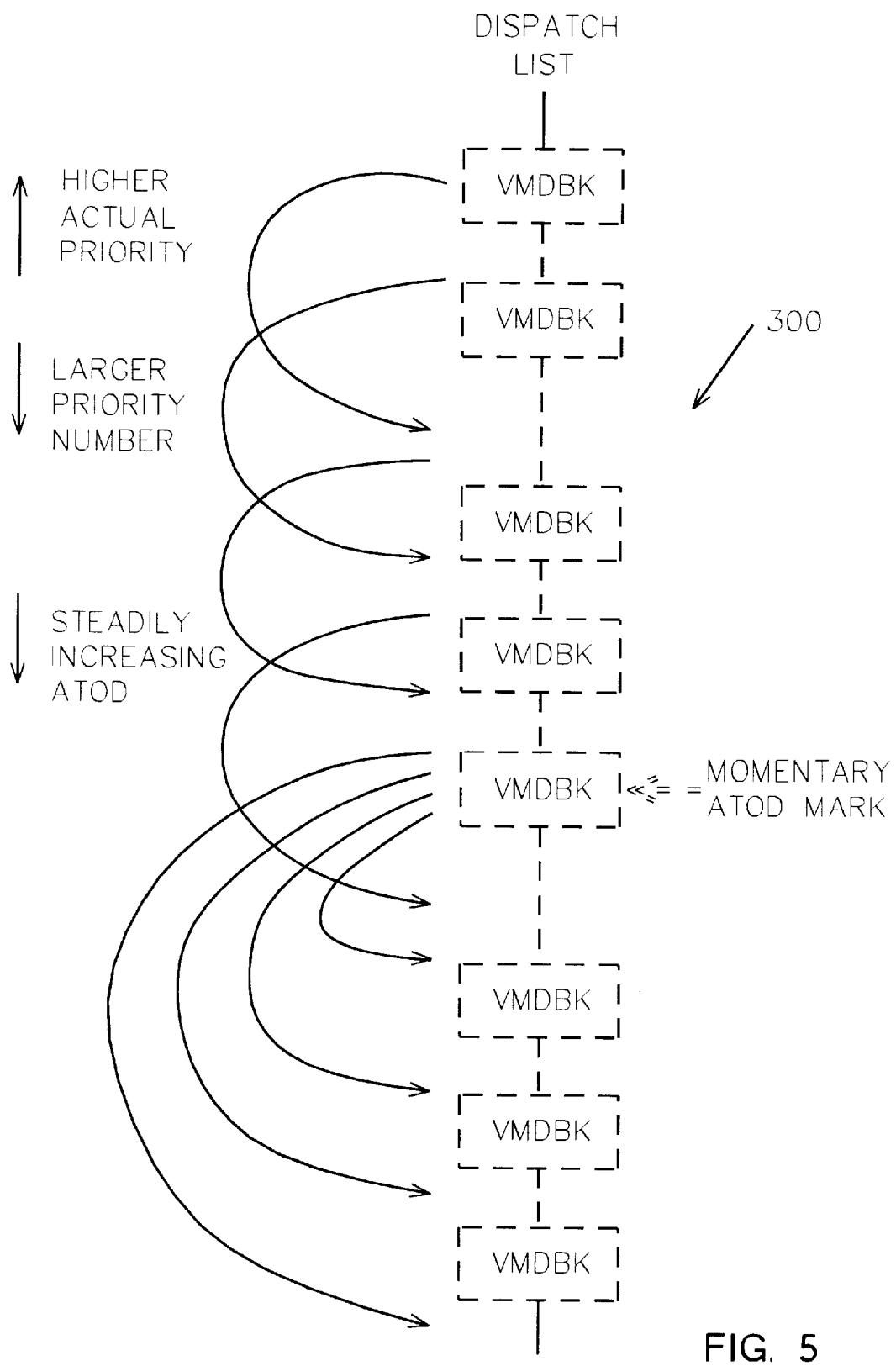
FIG. 5 illustrates a dispatch list.

FIG. 5 illustrates a dispatch list 300 at an instant in time. The dispatch list includes the users which are ready to execute and the users which are suspended. As noted above, the users on dispatch list 300 which are ready to execute are also listed on a run list to reduce searching time, but illustration of dispatch list 300 is better for purposes of explanation. The dispatch list is searched from top downwardly; the user with the highest priority (and lowest priority numbers) are listed at the top in order. When each user completes its time slice, if it has more work to do, the scheduler repositions the user on the dispatch list 300 (and indirectly on the run list) downwardly from its current position an amount equal to the offset 25 for this user. Thus, two factors effect the distribution of users on the dispatch list 300. The first factor is the magnitude of the offset 25. As noted above, the magnitude of the offset for each user is inversely related to its share in relation to the shares of the other users on the dispatch list and differs from other users with different shares. Thus, the smaller the share, the greater the offset. This tends to position the low share users near the bottom of the dispatch 300 for most of the time. The second factor is the amount of real time required by the user to complete its time slice. "I/O bound" users require substantial I/O time to complete a time slice because they and their time slice time are suspended for considerable time waiting for I/O operations to complete after the user initiates them. Therefore, I/O bound users require considerably longer real time than the one millisecond time slice to complete their time slice of execution and once an I/O bound user rises to the top of the run list 300, it will remain there a considerable time before completing its time slice and being offset downwardly. Conversely, "CPU bound" users require little I/O time and complete their time slice nearly continuously in one millisecond or slightly longer. Therefore, CPU bound users are frequently offset downwardly and generally reside near the bottom of the dispatch list.

Thus, at any instant, the I/O bound users and other users with very large shares tend to be located near the top of the dispatch list and CPU bound users and users with very small shares tend to be located near the bottom of the dispatch list. Of the two factors, share and I/O vs. CPU boundness, the amount of I/O vs. CPU boundness has a greater effect on the position in the dispatch list (for the normal range of shares). The positioning of the users on the run list in the manner described above yields a high throughput because when an I/O bound user becomes ready to execute, i.e. the last I/O operation completed, the user is likely to be located near the top of the run list 300 and will obtain a CPU quickly.

In FIG. 5, these offsets are shown as the downwardly-sweeping arrows at the left. Some offsets are longer or shorter than others because different users have different shares. In a typical situation, all users below the current (momentary) ATOD mark are CPU-bound, while all users above the current ATOD mark are I/O-bound. The users get sorted out that way due to the effects described above. Also, the dispatcher will generally not need to search much below the current ATOD mark to find a ready user because the CPU-bound users near there can almost always be dispatched. Thus the "offset" arrows on the left side of FIG. 5 at and below the ATOD mark will generally tend to originate from users at or slightly below the ATOD mark. However, in the upper part of the dispatch list, above the ATOD mark, the arrows tend to originate anywhere. Note that when an I/O-bound user completes a time slice, because of its typical high priority and high position at the time of the previous time slice, it does not usually move to the bottom of the list, and usually still remains above the ATOD mark. Thus, an I/O bound user is likely to get dispatched again immediately after completing an I/O wait, and high throughput is maintained.

The foregoing scheduler "pushes very hard" on users who have difficulty absorbing their shares. As one of these users falls farther and farther behind on its assigned share, it rises higher and higher in the dispatch list until finally, if there is any hope of this user taking its full share it will do so. Thus the foregoing scheduler does not merely give desired ACCESS to each user to a CPU, but it is effective in giving much of the desired SHARES to each user of the CPU. The desired shares are provided without calculating a history of the consumption of each user. This is because the "history" resides in the user's dispatch list position. The user's position in the dispatch list relative to the ATOD mark represents the share of processor time that the user has received in the past relative to what the user deserves. If the user has gotten exactly what it deserves until now, then the user will be located exactly at the ATOD mark. If the user is above the ATOD mark, then the user has received less than what the user deserves. If the user is below the ATOD mark, then the user has received more than what the user deserves.

The required fraction R' determined in step 204 is normalized in step 206 as follows. There are three different normalization cases and two variations of each case. In all three cases, the calculation is based on either the sum of the required fractions for all users on the dispatch list (SRMRTHRU) or just those users below the ATOD mark (SRMCTHRU). In the second and third cases, in order to enforce the limits as described above, the VMDBK is considered differently depending on whether or not it is found to be hitting its (hard or soft) limit. The sum of the R's of all users in the dispatch list is represented by:

$$SRMRTHRU=SRMRTHRN+SRMRTHRL+R'$$

where SRMRTHRN is the sum of the required fractions of all users in the dispatch list which are either unlimited or have not hit their limits, and SRMRTHRL is the sum of the required fractions of all users in the dispatch list which have hit their limits, and where the R' shown being added represents R' of the one user currently being considered and which, at the time of calculation, has not been added into either SRMRTHN or SRMRTHL yet. Similarly, for the sum of just the users below the ATOD mark:

$$SRMCTHRU=SRMCTHRN+SRMCTHRL+R'$$

where SRMCTHRN is the sum of the required fractions of users below the ATOD mark which are either unlimited or have not hit their limits, and SRMCTHRL is the sum of the required throughputs of users below the ATOD mark which have hit their limits. (The letter "C" in each of these variables is a reminder that the users below the ATOD mark can be regarded as CPU bound.) In the calculation below (for the three cases) only the SRMRTHRN and SRMRTHRL variables are shown, however, it is important to note that the variables SRMCTHRN and SRMCTHRL are intended to be substituted if the user being examined is one who is below the ATOD mark. This accounts for the two variations mentioned earlier of each of the three cases.

First Case

If ((SRMRTHRL+SRMRTHRN+R')>1 AND SRMRTHRL>0.5), then, some user's shares have to be made smaller and because the users hitting their limits make up a large part (>0.5), they are all included in the reduction this time. Then, the current user is normalized as follows:

$$Normalized\ R'=R'/(SRMRTHRL+SRMRTHRN+R')$$

Thus, the current user's share becomes smaller.

Second Case

If ((SRMRTHRL+SRMRTHRN+R')>1 but SRMRTHRL<0.5), then some users' shares have to be made smaller. But the users hitting their limits don't amount to much (their R's sum to <0.5), so they are not normalized. Then the current user's share is adjusted as follows only if the current user is not hitting its limit.

$$Normalized\ R'=R'*(1-SRMRTHRL)/(SRMRTHRN+R')$$

Thus the share of a user which has not hit its share becomes smaller. However, a current user which has hit its share uses the following:

$$Normalized\ R'=R'(limit)$$

where R' (limit) is the normalized fraction of the specified hard limit or soft limit, i.e. the hard limit or soft limit adjusted for the effects of the eligible list time. Because the normalized fraction is limited for a user which has hit its limit, this limits the share of such users at their respective limits as long as there is at least one user which has not yet hit its limit or at least one unlimited user.

Third Case

If ((SRMRTHRL+SRMRTHRN+R')<1.0), then, some users' shares should be made larger. Because the shares of the users which have hit their limits should not be made larger, adjustments are made only to the users which have not hit their limits. If the current user has not hit its limit, its share is adjusted as follows:

Normalized R'=(Same as case (2) above.)

But this time the normal user's share becomes larger (unlike case (2) above). However, if the current user hits its limit, its share is adjusted as follows:

Normalized $R'=R'(\text{limit})$

Because the normalized fraction is limited for a user which has hit its limit, this limits the share of such users at their respective limits as long as there is at least one user which has not yet hit its limit or at least one unlimited user.

The reason that the first and second cases differ is that it is preferable, if possible, not to reduce the shares of limited users because the shares of such users are never increased (see third case). In contrast, a loss of share for an unlimited user will be made up statistically by getting a larger share at other times.

In distinguishing between the first and second cases, a test is made for SRMRTHRL>0.5. The R' of the current user is not considered in both of these cases because the user's share is being made smaller, not larger. It is therefore unlikely to hit its limit. Therefore, such a user is not viewed as hitting its limit when testing to see if such users sum to >0.5.

In the first case, each R' is divided by the sum of all the R's. Thus the resulting values (Normalized R's) will sum to 1. The expression (SRMRTHRL+SRMRTHRN+R') represents the sum of all the R's.

Recall that SRMRTHRL and SRMRTHRN are the component parts (or array elements) of SRMRTHRU and that SRMRTHRU is the sum of the R's. Except that at the point of doing the calculations in the cases above, R' of the current user happened to be subtracted out of SRMRTHRU and it could not be determined which element to add the new R' back into yet. Therefore the expression (SRMRTHRL+SRMRTHRN+R') shows R' being added in explicitly.

In the second case, R' is only adjusted for the users which have not hit their respective limits, whereas the R's for the users which have hit their respective limits remain constant. Thus the R's of the users which have not hit their limits are normalized by dividing by the sum of the R's of all users which have not hit their limits (SRMRTHRN+R') and then multiplying the result by (1−SRMRTHRL). The latter factor is required because the normalized shares of the users which have not hit their limits should not sum to one because there are also users which have hit their limits. Because normalized R's obtained by just dividing by (SRMRTHRN +R') and omitting the multiplier would give values that sum to 1, it follows that after they have been multiplied by (1−SRMRTHRL) they will sum to (1−SRMRTHRL). The R' values included in SRMRTHRL have in fact been set equal to the limit, R' (limit).

For the following reasons, excess processor time is available, in proportion to their absolute or relative shares, to all users who have not yet reached their soft or hard limit. Graphically, this occurs with the users in the dispatch list advancing (ideally) at the same rate as the ATOD mark. In general, the foregoing mechanism attempts to share processor time in proportion to the absolute and relative shares by setting (or adjusting) the offsets accordingly.

As for users below the ATOD mark, this proportionment results from two characteristics of the foregoing normalization of R' in step 206. As noted above in the description of step 206, the normalization of the required fraction R' for each user below the ATOD mark is based on the sum SRMCTHRU for the set of users below the ATOD mark, excluding those above the ATOD mark. Therefore, this will tend to give the users below the ATOD mark a higher priority, which results from a smaller offset because the denominator of "Normalized R' equation" is smaller, i.e. each user's share appears to be a greater percentage of the total when the total is limited to only those users below the ATOD mark. Meanwhile, although the I/O bound users above ATOD are slow to use their time slices, they do use some of the processor time. Therefore, because less than 100% of the CPU service will be delivered to the users below the ATOD mark, and their offsets are now based on them getting 100%, the users below the ATOD mark will tend to move slowly upward and in fact start to lag behind the ATOD mark. However, lagging behind the ATOD mark will tend to move such users downwardly again in the dispatch list for the following reason. As soon as a user moves above the ATOD mark, it will no longer be in the set of users below the ATOD mark; therefore, SRMRTHRU, not SRMCTHRU, will be used in the denominator of the "Normalized R'" equation. This movement above the ATOD mark will tend to move such users downwardly in the dispatch list again because the denominator of the "Normalized R'" equation will then be larger (resulting in a smaller normalized R', but larger offset). The net effect of these two tendencies to move above and below the ATOD mark is that the "surplus" service will be given out (to users who can use it) in proportion to the installation defined absolute and relative shares. These users advance at the same rate as the ATOD mark, not faster.

The users located high above the ATOD mark are offered as much processor time as they can use, but they cannot generally use much of their share of the excess; not even the full amount of their original share. However, if their condition changes such that they become CPU bound, they will soon fall below the ATOD mark for reasons noted above, and then be governed by the preceding principals which give them the excess processor time in proportion to their installation defined share.

The foregoing description of the normalization of shares of step 206 explains how a hard or soft limited user will be limited to their respective limits provided there is (below the ATOD mark) at least one other user which has not hit its limit or at least one unlimited user. The following describes how a hard limit user is prevented from receiving a share greater than its hard limit, and how all excess processor time remaining after all users have hit their respective limits is allocated to the soft limited user with the greatest share.

As noted above, when a user completes a minor time slice it is moved downwardly in the dispatch list by one offset calculated in step 160. But before being moved, a determination is made whether this would move it past a MAXFALL limit. The MAXFALL limit for each user is equal to four times the offset for the user, i.e., four offsets beyond the ATOD mark. If an unlimited or soft limited user would move past the MAXFALL limit due to its respective offset, it is moved downwardly to its MAXFALL limit and not beyond. The MAXFALL limit enables the unlimited and soft limited users to get more than their share because it will result in a positioning higher in the dispatch list than their shares dictate otherwise. In fact, when all users have hit their limits and there are no unlimited users, the soft limited user with the greatest share will obtain substantially all remaining excess processor time because such a user will have the smallest offset and therefore the smallest MAXFALL limit. This will position such a user above the other soft limited users in the dispatch list and give such a user all the excess processor time that such a user can utilize.

However, hard limited users will not be limited by the MAXFALL limit although when falling below the MAXFALL limit, the hard limited user will be moved from the run list to a limit list. The limit list is ordered according to user priority (VMDLPRTY). Therefore when a hard limited user falls below the MAXFALL limit, it generally will not complete any more minor time slices or move further downward in the dispatch list. This will prevent the hard limited user from obtaining any processor time in excess of its specified limit because the dispatcher does not dispatch users who are in the limit list (while a user is in the limit list it is not allowed to enter a run list).

Users are removed from the limit list after they have spent enough time there such that they are no longer ahead of schedule. This is accomplished as follows. A second "artificial time-of-day" clock "ATOD2" is formed. This ATOD2 time will advance both in proportion to productive CPU service given to users and in proportion to wait time. When ATOD2 reaches the limit list deadline of a user at the head of the limit list the user will be removed from the limit list and put back in a run list. To give the user time to complete a time slice by the time the deadline arrives, the user is entitled to leave the limit list one time slice prior to its deadline. Meanwhile the existing ATOD will continue to be used to establish a starting dispatch list priority for users entering the dispatch list, and to calculate the MAXFALL limit. In other words, ATOD serves as the "deadline" for the dispatch list and runlists.

Occasionally a user will experience an excessively long I/O wait due, for example, to an I/O device which requires human intervention before it can continue. Consequently, the user will be located extremely high on the dispatch list, well above other users. This is problematic when the user starts to run again because if the user turns CPU-bound then all other users will be prevented from running until the user moves down past them, and that could take too long if the user is very high and if the normal offsetting mechanics were depended upon to bring the user down. Therefore, the following mechanism is used to detect such users and to offset them downwardly enough to position them in the vicinity of other users who are high on the dispatch list but have not experienced such excessive I/O waits. Whenever a "nonsuspect" user (i.e. a user which is not yet suspected of being excessively I/O bound) completes a time slice, the user is moved downwardly by one offset as described above. However, if the user does not pass another "nonsuspect" user during this movement, the moving user is designated as "suspect". (This is done by setting a bit associated with the moving user.) The next time that this suspect user completes a time slice, the suspect user is moved downwardly by the normal offset and if the user passes a "nonsuspect" user during this movement then the moving user is marked as "nonsuspect" again; otherwise, the moving user is moved further downwardly until just above the first "nonsuspect" user that the moving user encounters. In addition, all users below the ATOD mark are "nonsuspect".

A "suspect" user is one which has been given the TOD-TIED (TT) attribute. The purpose of the TOD-TIED mechanism is not to re-arrange priorities, but rather to keep the relative order of users as normal, and reduce any gaps caused by rising too high. The TOD-TIED (TT) attribute will belong to all users at or below ATOD. It is also propagated upward (from ATOD) from one VMDBK to another whenever a VMDBK's repositioning steps it over a VMDBK with TT. If a VMDBK above ATOD does not step over another with TT, it loses the attribute. After its next minor timeslice, if a VMDBK can't get TT back, it is forced down to just-above the next VMDBK with the TT attribute (or ATOD, if there are no intervening users).

An excessively I/O bound user may rarely finish its minor time slice on schedule because it is waiting for I/O to complete. The user appears to be falling behind schedule because of its requests for I/O operations rather than because the system is too busy to allow sufficient CPU resource to the user. Scheduler 44 would naturally tend to schedule this user with a higher priority because it seems to be falling behind schedule. The purpose of the TOD-TIED 28 boundary is to keep excessively I/O bound users from getting too high a dispatch priority 35. If a user stays excessively I/O bound for some time, its priority would get higher and higher. When this is the case, the user's priority is very high and this user could monopolize the system's CPU resources if it should go CPU bound the next time it is dispatched. To avoid this scenario, a user acquires the TOD-TIED attribute when its dispatch priority 35 falls behind ATOD 23, a high priority. From then on, user's with this TOD-TIED attribute will be given priorities which are bounded in such a way that they will be clustered together on the dispatch list fairly close to ATOD in priority so that they will not be able to take over the system if they become CPU bound. This TOD-TIED, or "suspect" mechanism is used to keep users' dispatch priorities within a reasonable displacement from ATOD on the high priority side, while Maxfall is the mechanism used to keep users bounded on the low priority side of ATOD.

The ATOD clock advances in proportion to the available usable CPU time. System time (overhead) is not usable toward users' tasks or shares and therefore, does not count toward advancing ATOD. Each executing CPU regularly increments ATOD; waiting CPUs. do not. This is driven by the dispatcher at steps 120 and 122. ATOD advances according to how much user-time has been delivered by the several real CPUs. since the last increment. That is, each CPU increments ATOD in proportion to the advancement of that CPU's actual user execution time accumulator (PFXUTIME). The intent (when all CPUs. are running productively) is for ATOD to advance approximately at real time (wall clock time or TOD). When all N CPUs. are running, each CPU is generally advancing its own PFXUTIME at nearly real time. Therefore the contributions of the N CPUs. are divided by N.

$$ATOD=ATOD+(delta\ of\ PFXUTIME)/N$$

where "delta of PFXUTIME" is the change in this CPU's PFXUTIME accumulator since the last time it was checked.

ATOD2 includes each CPU's user-time (PFXUTIME) and each CPU's wait time (PFXTOTWT):

$$ATOD2=ATOD2+(delta\ of\ PFXUTIME+delta\ of\ PFXTOTWT)/N$$

where PFXUTIME and PFXTOTWT are both doubleword clocks similar to the CPU Timer.

However, when any CPU is waiting for several successive intervals, then another executing CPU will act on its behalf to make contributions of wait-time to ATOD2 (and under some circumstances to ATOD also). It is assumed that such a waiting CPU is spending all of its time in wait state and, for wait state, its contribution to ATOD2 should be the same as the advance of real time (as measured by the TOD clock). However, no assumptions or contributions are made by another CPU for execution time of the waiting CPU. When such a waiting CPU begins to execute again, it will make its own contribution to ATOD in the normal manner and to ATOD2 for just the final, possibly fractional, interval according to real time. (The other CPU has taken care of prior intervals.)

As noted above, some wait-time is counted toward ATOD when there are one or more CPUs. waiting for several successive time slice intervals, and at the same time the current CPU does not have any work (VMDBKs) in its run list. If the current CPU had work in its run list then it is likely that the waiting CPUs. are not "usable" to do that work, otherwise they would in all likelihood, already be doing the work. Conversely, if the current CPU does not have any work in the run list, it will be fairly safe to count a waiting CPU as if its wait-time is usable time. Therefore, when there are one or more CPUs. in extended wait mode and at the same time the current CPU does not have any work in its run list, the current CPU uses the following formula instead of the previous one.

$$ATOD=ATOD+(Delta/N)+(Delta/N)*TRKCT/(N-TRKCT)$$

where ATOD=ATOD+(Delta/N) represents the original formula with "Delta" being shorthand for "delta of PFXUTIME", and "(Delta/N)*TRKCT/(N−TRKCT)" is the term added to account for wait-time with "Delta" again being shorthand for "delta of PFXUTIME" (and not "delta of PFXTOTWT"). TRKCT is SRMTRKCT, the count of CPUs. currently still in extended wait mode.

If the waiting CPUs. were allowed to (eventually) make contributions for their own wait times, the contributions would arrive in big lumps. But, using the formula above, the acting CPU makes contributions on behalf of the waiting CPUs. of a size no larger than its own (CPU-based) contribution. Thus the basic size of the contribution in the second term is represented by Delta/N and is multiplied by SRMTRKCT to contribute for the several extended-wait mode CPUs. But then the result is divided by (N-SRMTRKCT) because there are this many other CPUs. like the current one (i.e., not in extended-wait mode) which, like the acting one, will make a contribution just like the acting CPU.

The SRMTODSV timestamp is a good approximation of the current TOD although it is only updated intermittently—at every minor time slice end (and other scheduling points) and whenever a VMDBK is made ready, i.e., following most I/O operations. Although SRMTODSV is accurate enough for deciding whether or not it is time to update ATOD, once that decision is made, a more accurate TOD value is used.

As noted above, wait-time of a CPU is not always included in ATOD because otherwise ATOD could advance faster than the users and then the "suspect/nonsuspect" mechanism described earlier (which serves to limit how high users can be in the dispatch list) would advance all the users uniformly, without regard to their shares. Nevertheless, the total exclusion of wait-time from ATOD causes a problem if only one (or a few) of a system's several CPUs. is running, and the others are usually waiting. In such a case, ATOD will lag behind and not advance in proportion to real time. That is not a problem in the case of unlimited and soft limited users or small share, hard limited users, but would cause a noticeable discrepancy for large share, hard limited users. This is because users with small shares take such big steps downward in the dispatch list after completing a time slice that modest differences between ATOD and TOD are not significant. But for hard limited users with large shares (and corresponding small offsets), accurate motion of ATOD is important. ATOD should follow along behind the user with a large SHARE at a relatively rapid pace so that the user does not outrun it too quickly, hit the MAXFALL limit, and get put in the limit list prematurely. If this were allowed to happen, the system would display the following undesirable characteristic that a hard limited user on a busy system would get its share, but on an un-busy system (especially when it is alone on the system) it would get less than its share. This is prevented from happening by including the wait-time (or some of it) in ATOD when there is substantial wait-time and the wait-time can be proven to be "usable" for the existing work. As noted above, when there are CPUs. waiting and the current CPU does not have any work in its run list, then some portion wait time is included in ATOD. The current CPU contributes to wait time on behalf of the waiting CPUs.

In the copending Davison application Ser. No. 08/252, 864, it is observed that over-contributions of wait time could be harmful as it could cause the "suspect"/"nonsuspect" mechanism to advance all users uniformly, disregarding their shares. By making the contributions equal to no more than the amount of CPU time (delta of PFXUTIME) that the current CPU is using, Davison teaches that a full contribution is made when it counts, i.e., when there is CPU-bound work and the likelihood that a user will get put in the limit-list, and a lesser contribution is made when the CPU is not so busy. This "lesser contribution" of wait time added by Davison is, in accordance with the present invention and as will be described hereafter, augmented by substantially all of the wait time under circumstances which occur much more frequently and, therefore, achieves a remarkably better result.

Because users in the runlists and the limit list are timed with different clocks (ATOD and ATOD2) that run at different rates, a translation is performed when a user is moved into or out of limit list 27. While a user is in the limit list, the user has two priorities—a dispatch list priority (VMDDPRTY) 35 and a limit list priority (VMDLPRTY) 29. The limit list priority is derived from the user's dispatch list priority. The intent is that as the user begins its "delay" in the limit list 27, the user should have the same displacement from ATOD2 21 as it has from ATOD 23. That displacement represents the amount of delay that should pass before the user is due to run again, but the delay needs to be measured on the ATOD2 clock (in order to allow "wait time" to count fully). Therefore the translation is:

$$VMDLPRTY=ATOD2+(VMDDPRTY-ATOD)$$

This computation of VMDLPRTY is done when the user enters the limit list. When the user leaves the limit list, the user should enter a run list one minor time slice prior to the user's deadline. Therefore (by definition) when a user is moved to a run list from the limit list, the user's VMDDPRTY is set to (ATOD+TS) with compensation noted below for some slight delay beyond the limit list deadline before noticing the user and getting the user moved:

$$VMDDPRTY = (ATOD + TS) - ((ATOD2 + TS) - VMDLPRTY)$$
$$= VMDLPRTY + ATOD - ATOD2$$

Figure 6:
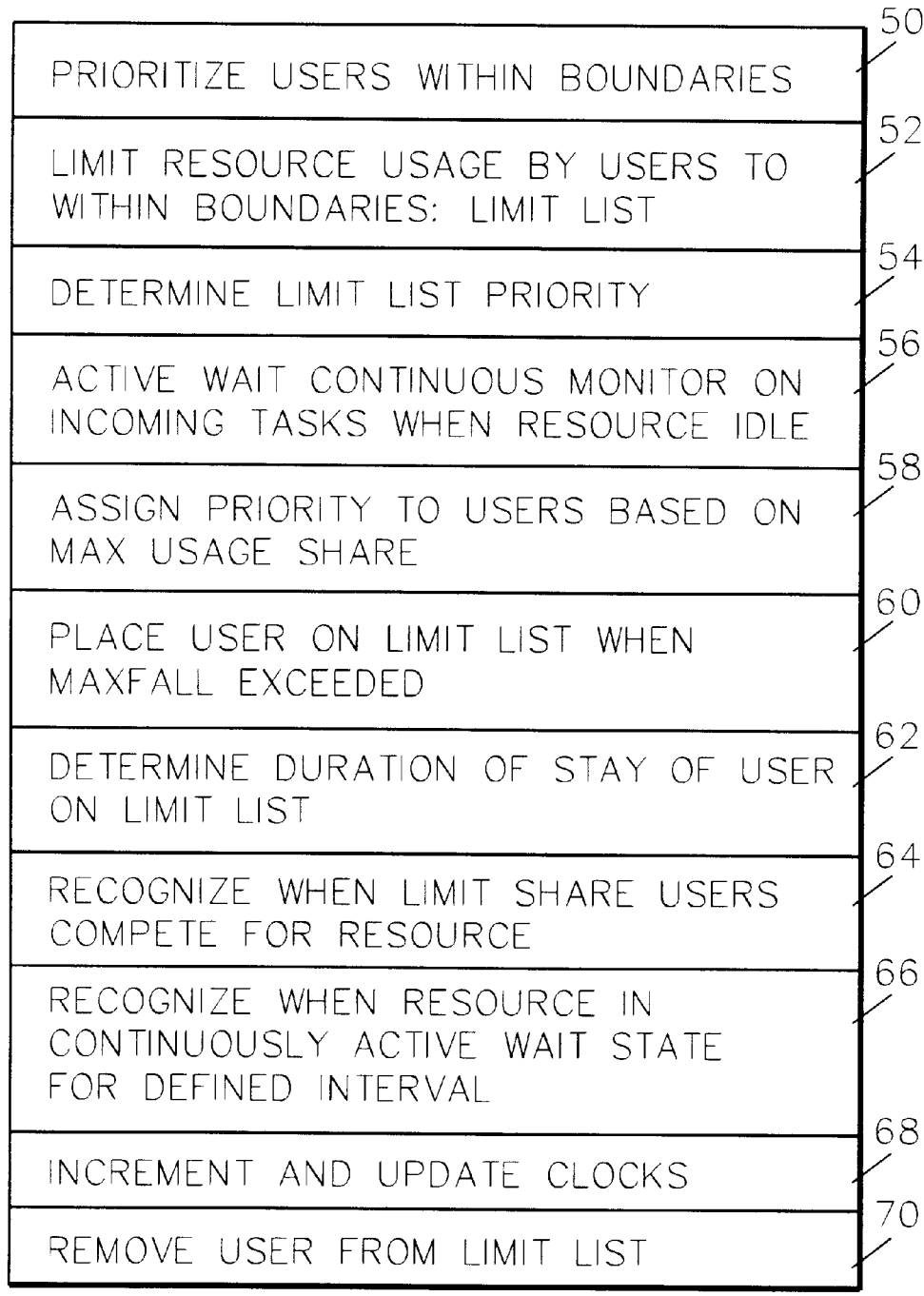
FIG. 6 is a diagrammatic representation of programming modules implementing a preferred embodiment of the method of the invention.

Referring to FIG. 6, in connection with FIG. 1, a diagrammatic representation is set forth of programming elements, referred to hereafter as steps, for implementing the preferred embodiment of the method of the invention for scheduling central processor usage amongst relative share and absolute share users in such a manner that users are not waited too early or removed from waiting too late. The relationship between these steps, which is not necessarily sequential as shown in FIG. 6, will be described hereafter in connection with the pseudo code representation of the preferred embodiment of the invention in Table 1.

A user's share of central processor or other system resource 20 consumption may be limited to an absolute value, which is a precise maximum amount 26, say 20% of the CPU resource 20. In this usage, absolute value does not refer to the mathematical definition generally associated with this term, but rather comes from the IBM VM scheduler concepts of relative share and absolute share. For example, if five users are defined with a relative share of 100 each and all five are active, scheduler 44 attempts to give each of them one fifth of the system CPU resource 20. If only four of them are active, scheduler 44 attempts to give each of them one fourth of system resource 20. They each get a relative share of the system based on their priority and the total priority of all the relative share users who are active at the time. An absolute share of the system can be given to one user also. For example, a user can be given an absolute share of 20% of the system. This means that this user gets 20% of the system resource no matter how many relative share users are active. The relative share users are given a proportional share of the remaining, in this case, 80% of the CPU resource.

In step 50 users are prioritized for processor usage by a value 35 determined within boundaries defined by (a) user minimum share assignment 24, (b) a first artificial time of day clock (ATOD) 23 which advances when users are consuming central processor unit (CPU) resources 20, (c) a high dispatch priority limit (TOD-TIED) 28 and (d) a low dispatch priority limit (maxfall) 18.

User limits as to share of system resources are defined in a system directory by way of specified absolute or relative values. A VM directory, for example, is used to define a user to the system. There is an entry for each user that can contain SHARE statements 24, 26 to specify what share, either relative or absolute, of the system resource this user can have. This share can also be modified dynamically while the system is running by using a SET SHARE command.

Users are given system resource by 'prioritizing within boundaries', by which is meant that a user is given system resource, such as CPU resource 20, based on its priorities 35 but only so long as a newly calculated priority does not cause the user's share of the system to fall below its defined minimum share 28 or exceed its defined maximum share 26. In the case of the VM scheduler 44, for example, a user can be defined with a minimum relative or absolute share 24 and a maximum relative or absolute share 26. These definitions form boundaries which are considered when calculating the dispatch priority value 35 for a user. For example, if a user is assigned a relative share 24 of 200 and a 'limithard' absolute maximum share 26 of 20% and only this user and another relative 200 user are active, the 'limithard' user will be prioritized within the 20% maximum boundary 26 even though that user could receive 50% of the system CPU resource 20 if the maximum boundary had not been specified.

A user for which a 'user minimum share' 24 is defined is entitled to a share of system resource based on that user's specified relative share as a proportion of the total relative share of all the active users. The user minimum share is specified in the VM directory for that user, and is calculated the same as remaining share (described above), but using the specified minimum share from the directory. The user maximum share is also the same calculation except that it is based on the user's specified maximum share 26 in the VM directory.

'Artificial time-of-day' (ATOD) 23 is a system wide time-of-day clock formatted field. A particular CPU resource cannot be both working (i.e., consuming) and waiting at the same time, and the value ATOD 23 increases during the time that user (any user) work is being done on the system, as distinguished from system overhead. The dispatch priority calculations of the system are based on and compared to the ATOD value 23. 'ATOD' 23 and 'ATOD2' 21 are both artificial time of day clocks. Neither ATOD nor ATOD2 are actual clocks, but rather are fields maintained by software which are in TOD clock format and in which time values are accumulated. The software updates these fields as appropriate. ATOD2 accumulates all the time that the system is actually running user work plus the time that the system is waiting. ATOD accumulates all the time that the system is actually running user work, and under certain circumstances, it also accumulates wait time. So, ATOD is really an accumulation of a subset of the time that is accumulated in ATOD2.

It is an essential characteristic of the preferred embodiment of the invention that updating of ATOD with wait time occur in the active wait process rather than solely in the dispatcher path (as is the case in copending application by Davison, Ser. No. 08/252,864.) As will be discussed hereafter, the reason for updating ATOD with all of the wait time in the active wait process, rather than in the normal dispatcher path (which adds only a small portion of the wait time, as discussed above), is that it is only desirable to include the entire wait time in ATOD under certain circumstances, one being that active wait has been at least, for example, 250 ms. Thus, ATOD in general accumulates user work time. In most systems that would be the case. However, there are certain circumstances which lead to some wait time being included in ATOD. Heretofore, those circumstances have been extremely limited, or rare, and the amount of wait time included in ATOD was negligible. In accordance with the present invention, more wait time is included in the accumulation of ATOD under circumstances more frequently occurring: that is, during a low load situation (during the active wait routine), when there are limited users and the central processor has been active wait continuously for, for example, 250 milliseconds or more.

Priority limits 35 are defined by 'high dispatch' and 'low dispatch' values. In order to prevent a particular users dispatch priority 35 from getting too far out of line with the current ATOD value 23, scheduler 44, for example, limits the difference between the current ATOD 23 and the user's priority 35 to a maximum value called the high dispatch priority limit (TOD-TIED) 28 and a low dispatch priority limit (maxfall) 18. A user's dispatch priority 35 will not be set outside of those limits in order to prevent erratic response times for that user.

In step 52 resource 20 consumption is limited for users to specified absolute values within boundaries 18, 28 by (a) establishing user maximum limited share assignments 26 assigned to selected users, (b) providing a limit list 27, and (c) providing a second artificial time of day clock (ATOD2) 21 which advances when users are consuming CPU resource 20 and when CPU's are waiting.

A limit list is a list 27 of users whose consumption of resources has reached or exceeded the maximum absolute share allowed by their SHARE statements 24, 26 in the system directory, or by the SET SHARE command. While on this list 27, a user is not dispatched by scheduler 44, and therefore its resource 20 consumption is limited. A user can be specified with a maximum absolute share or a maximum relative share and either of these can be limithard. Limithard users with either type of maximum share (absolute or relative) can be limited by being placed on the limit list. There is also a limitsoft capability which works differently than the limithard function. Limitsoft users are not limited by being placed on the limit list.

In accordance with the present invention, in order to assure that a limithard user is not put on the limit list too soon or removed from the limit list too late, a user is added to the limit list when it is a limited user AND its dispatch priority is recalculated to a new dispatch priority which exceeds maxfall (current ATOD+N*offset) AND the user is reaching its limit. A user is removed from the limit list when ATOD2 is calculated to be within one minor time slice of the user's limit list priority, where N is some preselected value, by way of example, N=4.

In step 54 limit list 27 priority for the user is determined, and also whether to remove users from the limit list based on advancement of the second artificial time of day clock 20 (ATOD2) 21.

In step 56 an active wait continuous monitor 30 of incoming tasks 32 is provided when the CPU is idle. This 'active wait routine' or 'active wait mechanism' is the method used in a multiprocessing system by which a process with no work to do, loops and actively looks for work that becomes available rather than loading a disabled wait state. This relieves the processor of the burden of having to recognize that work has been stacked on it from the processor stacking the work to the processor on which the work is being stacked.

In step 58 priority is assigned to users based on maximum usage share 26, which is the maximum share of the CPU resource that is available to a user that is limited by its share definition 26 in the directory. There are times when the scheduler 44 assigns priority based on the share of the system available for that user only and there are times when the available share is more than the user is allowed due to it being a limited share user. When the user is limited (by being present in limit list 27) and the share available is more than the share 26 the user is allowed, the 'maximum usage share' 26 is used to calculate the user's dispatch priority 35.

In step 60 users are placed on limit list 27 when the low dispatch priority limit (maxfall) 18 is exceeded by the new value calculated for the user's dispatch priority 35. Dispatch priority 35 is calculated at different times for a user. The check to determine if a user should be placed on the limit list 27 is made at the time that the user's dispatch priority 35 is recalculated.

In step 62 the duration of stay 29 on the limit list is determined with reference to ATOD 23 and ATOD2 21. When a user's dispatch priority 35 is calculated, it is a prediction of the value of ATOD 23 at which an event will occur in the future, that event being the end of the user's minor time slice. This predicted value of ATOD 23 is used as the user's dispatch priority 35. If it is determined that the user should be placed on the limit list 27, ATOD2 21, rather than ATOD 23, is used as the basis for removing the user from the list. The dispatch priority of the user based on ATOD 23 must then be changed to a limit list priority 35 (predicted time to come off the limit list 27) which must be based off of ATOD2 21. The calculation used to do this is: Limit list priority=ATOD2+(dispatch priority−ATOD).

In step 64 it is determined when limit share users are competing for CPU.

In step 66 it is determined when a system resource, such as the central processor unit (CPU), has been continuously and for a defined interval of real time in an active wait status (running without interruption; that is, without finding and running any user work 32). This determination is made by saving the value of the real system TOD clock when the active wait state is entered and comparing it to the current TOD value.

In step 68 the ATOD 23 is incremented and the ATOD2 21 updated.

In accordance with the preferred embodiment of the invention, this incrementing of ATOD 23 is done during the active wait process 30. Each time through the loop of active wait code, a check is made to determine if there are users on the limit list 27. If there are and if the active wait process has been running continuously for a specified interval of time (for example, 2.5 milliseconds), then the ATOD 23 value is increased by the entire amount of time which has passed in active wait since the last time ATOD 23 was updated. Thus, if the system is in a low load state (as defined by the processor being in active wait for at least 250 milliseconds with no new work becoming available) and there are limited users on the limit list the entire wait time interval is added to ATOD 23.

This updating of ATOD2 21 is also done during the active wait process 30, by virtue of its call to the dispatcher. Each time through the loop of active wait 30 code, a check is made to determine if there are users on the limit list 27. If there are and if the active wait process 30 has been running continuously for a specified interval of time (for example, 2.5 milliseconds) then the active wait routine calls the dispatcher, which increases the ATOD2 21 value by the amount of time which has passed in active wait since the last time ATOD2 21 was updated. By calling the dispatcher to update ATOD2 during active wait processing when in low load state, more frequent checks are made for the need to remove a user from the limit list.

In step 70 users are removed from limit list 27 if ATOD2 value 21 is within one minor time slice of the limit list priority 35 with the CPU continuously active wait status time included in ATOD2 21.

Thus, in accordance with the preferred embodiment of the invention, adding CPU wait time to ATOD 23 ensures that users do not get put on limit list 27 prematurely in low load (idle CPU) situations, and increased granularity of checking for removal of a user from limit list 27 by virtue of the call to the dispatcher from the active wait routine provides better precision for limit list stay. In this manner the size of the interval between the time when the limit list 27 is checked for users to be removed and the next time it is checked is much reduced. A smaller time interval means increased granularity.

Limit list 27 is used to hold a user in check when that user is receiving more CPU resource 20 than it is allowed (26). When this occurs, the user is placed on limit list 27 temporarily. Scheduler 44 makes checks to determine if it is time to take the user off of limit list 27. These checks are what is referred to as 'checking for removal' from the limit list. The 'checking' is event driven. Prior to the present invention, the limit list was checked by active processors (those with user work to do) during the process of scheduling and dispatching this user work. In accordance with the present invention, the active wait mechanism also causes these checks.

Table 1 sets forth a pseudo code explanation of the method of the preferred embodiment of the invention. The pseudo code is annotated with references to the steps of FIG. 2 in brackets [ ]. Referring to FIG. 1 in connection with Table 1, dispatcher 40 (named HCPDSPCH) is implemented by the dispatcher loop beginning at line 2, monitor 30 is implemented by the active wait routine beginning at line 18, and scheduler 44 is implemented by the schedule priority recalculation code beginning at line 36. At line 20, there is new work to run—for example, incoming task 32 is not empty. In line 25, the reference to 250 milliseconds could be tuned to a different system appropriate preselected time value. In both lines 11 and 27, the wait time since the last time wait time was added is added into ATOD and, by call to the dispatcher at line 32, into ATOD2. The reason wait time is being added during the wait routine by calling the dispatcher is key to the present invention. Previously, the wait time was never added into ATOD2 until line 11 processing occurred. In a low load situation, it could be quite a while until that processing happened. This has heretofore led to users on limit list 27 remaining there too long. With this invention, smaller increments of the wait time are being added more frequently in low load situations and the limit list is being checked at the same time, causing deserving users to come off the limit list when they should. Table 1, line 35 is represented by line 82 of FIG. 1, which has the additional meaning that active wait continuous monitor 30 goes to dispatcher 40 to update ATOD2 when the active wait continuous monitor 30 adds wait time to ATOD. The new priority mentioned at line 50 of Table 1 is the user's recalculated dispatch (i.e., deadline) priority that is used to determine when the user will be dispatched again. This dispatch priority is bounded by the limits of maxfall and TOD-TIED. Scheduler 44 uses this priority in line 58 to put the user on limit list 37 in priority order. The number "4" in the equation at line 54 of Table 1 represents an empirically defined optimum number, and could be varied without departing from the scope of the invention. At line 61 of Table 1, the user is reordered on dispatch list 37 based on its newly recalculated dispatch list priority 35.

TABLE 1

SCHEDULING ALGORITHM

| | | |
|---|---|---|
| 1 | SCHEDULING ALGORITHM: | |
| 2 | HCPDSPCH (Start of Dispatcher Loop): | |
| 3 | IF there is no work to dispatch THEN | |
| 4 | Go to the Active Wait Routine. | |
| 5 | ELSE | |
| 6 | Run priority system work (i.e. operating | |
| 7 | system overhead, not user work) | |
| 8 | IF a user's minor time slice just ended | |
| 9 | THEN Call the scheduler to recalculate | |
| 10 | the user's dispatch priority. | |
| 11a | Advance ATOD with user time. | [step 68] |
| 11b | Advance ATOD2 with user time and wait time. | |
| 12 | Remove user from the limit list if ATOD2 | |
| 13 | is within one minor time slice of that | |
| 14 | user's limit list priority. | [step 70] |
| 15 | Use the dispatch list to actually run user | |
| 16 | work based on dispatch list priority. | |
| 17 | Goto HCPDSPCH (End of Dispatcher Loop); | |
| 18 | Active Wait Routine processing: | [step 56] |
| 19 | FINDWORK (start of loop): | |
| 20 | IF there is new work to run THEN goto the | |
| 21 | Dispatcher to run the work item. | |
| 22 | ELSE | |
| 23 | IF there are users on the limit list | [step 64] |
| 24 | AND active wait processing has been | |
| 25 | running for 250 milliseconds THEN | [step 66] |
| 26 | DO | |
| 27 | Add wait time to ATOD. | [step 68] |
| 28 | Set indicator so that the | |
| 29 | Dispatcher will update ATOD2 | |
| 30 | and check the limit list for | |
| 31 | users to remove. | |
| 32 | Goto the dispatcher HCPDSPCH | |
| 33 | End | |

TABLE 1-continued

SCHEDULING ALGORITHM

| | | |
|---|---|---|
| 34 | END | |
| 35 | Go to FINDWORK (end of loop); | |
| 36 | Scheduler Priority Recalculation: | |
| 37 | Calculate user's share of the system based | |
| 38 | on the relative or absolute share specified | |
| 39 | in that user's directory entry and the | |
| 40 | shares of the other logged on users which | |
| 41 | are not dormant (wait listed) | |
| 42 | IF the user's share exceeds the maximum | |
| 43 | share allowed for the user THEN use the | |
| 44 | maximum share for "offset" calculation. | |
| 45 | Calculate the user's "offset" based on the | |
| 46 | user's share, the size of a minor time | |
| 47 | slice, and an adjustment based on an | |
| 48 | overrun the user had on the previous | |
| 49 | time slice. | |
| 50 | The new priority is determined as equal to | |
| 51 | the old priority plus the offset just | |
| 52 | calculated. | [steps 50, 58] |
| 53 | IF the user's new priority exceeds maxfall | |
| 54 | (current ATOD + 4*offset) AND this is a | |
| 55 | limited user AND the user is being | |
| 56 | scheduled at its maximum share (i.e. is | |
| 57 | reaching its limit) THEN | |
| 58 | Add the user to the limit list. | [steps 52, 54, 60, 62] |
| 59 | | |
| 60 | ELSE | |
| 61 | Reorder the user onto the dispatch list | |
| 62 | in priority order. | |
| 63 | end; | |

Advantages Over the Prior Art

It is an advantage of the invention that there is provided a scheduler system and method to facilitate allowing a user access to system resources closely approaching or equal to its hard limit in a low load situation.

It is a further advantage of the invention that there is provided an improved scheduler which facilitates optimal charging for system resources and reduces user discomfort over the amount of the charges or the availability of such resources.

It is a further advantage of the invention that there is provided a system and method for scheduling system resources to users having limited access by placing such users on a limit list not too soon, and removing them from the limit list not too late.

It is a further advantage of the invention that there is provided a system and method for scheduling system resources to users having limited access by enabling scheduling of resources not too late and inhibiting scheduling of resources not too soon.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Further, each step of the method may be executed on any of general computer, such as an IBM System 390, AS/400, PC or the like and pursuant to one or more, or a part of one or more, program modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for scheduling use of system resources by a user, comprising the steps of:
   maintaining a first clock;
   maintaining a second clock;
   during a dispatch process,
      if there is work to do, scheduling use of system resources to said user in dispatch priority order with other users only when said user is not in wait status; otherwise
      advancing said first clock by user time; and
      advancing said second clock by user time and wait time; and
   during a wait process,
      if there is work to do, calling said dispatch process; otherwise,
      timing wait time; and
      if there is a CPU in active wait status upon said wait time exceeding a predetermined value, incrementing said first clock by said wait time and calling said dispatch process.

2. The method of claim 1, further comprising the steps of:
   during a scheduler process,
      determining a user share for said user;
      if said uses share exceeds a predefined maximum allowed share, calculating a user offset based on said user share and a time slice adjusted for any overrun on a previous time slice;
      calculating a new dispatch priority for said user equal to a current dispatch priority plus said user offset;
      if said new dispatch priority exceeds said first clock by a function of said user offset, placing said user in wait status and calling said dispatch process; otherwise, calling said dispatch process; and
   during said dispatch process, upon said user completing a time slice, calling said scheduler process.

3. The method of claim 2, further comprising the steps of:
   further during said dispatch process,
      if said user is in wait status with a limit priority within one time slice of said second clock, removing said user from limit status.

4. A method for scheduling use of system resources among a plurality of limited users, comprising the steps:
   maintaining first time of day clock;
   maintaining a second time of day clock;
   executing a dispatch routine;
   executing an active wait routine;
   executing a priority recalculation routine;
   said priority recalculation routine including the steps of:
      calculating a user share for a first user;
      if said user share exceeds a predefined maximum allowed share, calculating a user offset based on said user share and the size of a minor time slice adjusted for any overrun on a previous minor time slice;
      calculating a user dispatch priority equal to an old priority plus said offset;
      if said user dispatch priority exceeds a maxfall value equal to said first clock plus a function of said user offset, and this is a limited user, and this user is being scheduled at its maximum share, then adding said user to a limit list;
      otherwise, reordering said user onto a dispatch list in priority order; and
      executing said dispatcher routine;
   said dispatcher routine including the steps of:
      if there is no work to dispatch, then executing said active wait routine; otherwise running any priority system work; and then
      if a said user's minor time slice just ended, executing said scheduler routine; otherwise,
      advancing said first time of day clock with user time;
      advancing a second time of day clock with user time and wait time;
      if a user on said limit list is within one minor time slice of said second time of daw clock, removing said user from said limit list; and
      dispatching users based on dispatch list priority; and
   said active wait routine including the steps:
      if there is new work to run, then executing said dispatcher routine; otherwise,
      if there are users on said limit list and active wait processing has exceeded a predetermined limit, then adding wait time to said first time of day clock; and executing said dispatcher routine;
   whereby users are added to said limit list not too early and removed from said limit list not too late.

5. A method of scheduling system resources, comprising the steps of:
   prioritizing users for processor usage within boundaries defined by user minimum share assignment, a first artificial time of day clock which advances when users are consuming system resources, a high dispatch priority limit, and a low dispatch priority limit;
   limiting central processor unit consumption by users to specified absolute values within said boundaries by establishing user maximum limited share assignments assigned to selected users, providing a limit list, and providing a second artificial time of day clock which advances when a user is consuming system resource and when said system resource is waiting;
   determining limit list priority and when to remove from said limit list based on advancement of said second artificial time of day clock;
   providing an active wait interactive continuous monitor of incoming tasks when said CPU is idle;
   assigning priority to users based on maximum usage share;
   placing users on said limit list when said low dispatch priority limit is exceeded;
   converting time of said first artificial time of day clock to time of said second artificial time of day clock to determine duration of stay on said limit list;
   recognizing when limit share users are competing for CPU resource;
   recognizing when said system resource has been in a continuously active wait status for a defined interval of real time and responsive thereto updating said first artificial time of day clock and said second artificial time of day clock by wait time; and,
   removing users from said limit list for which said second artificial time of day clock value exceeds said limit list priority with substantially all of said wait time included in said second artificial time of day clock under low load conditions.

6. A program storage device readable by a machine, tangibly embodying a program of instructions executable by a machine to perform method steps for scheduling use of system resources by a user, said method steps comprising:

maintaining a first clock;

maintaining a second clock;

during a dispatch process,
if there is work to do, scheduling use of system resources to said user in dispatch priority order with other users only when said user is not in wait status; otherwise
advancing said first clock by user time; and
advancing said second clock by user time and wait time; and during a wait process,
if there is work to do, calling said dispatch process; otherwise,
timing wait time; and
if there is a CPU in active wait status upon said wait time exceeding a predetermined value, incrementing said first clock by said wait time and calling said dispatch process.

7. An article of manufacture comprising:

a computer useable medium having computer readable program code means embodied therein for scheduling use of system resources by a user, the computer readable program means in said article of manufacture comprising:

computer readable program code means for causing a computer to effect maintaining a first clock;

computer readable program code means for causing a computer to effect maintaining a second clock;

computer readable program code means for causing a computer to effect during a dispatch process,
if there is work to do, scheduling use of system resources to said user in dispatch priority order with other users only when said user is not in wait status; otherwise
advancing said first clock by user time; and
advancing said second clock by user time and wait time; and computer readable program code means for causing a computer to effect during a wait process,
if there is work to do, calling said dispatch process; otherwise,
timing wait time; and
if there is a user in wait status upon said wait time exceeding a predetermined value, incrementing said first clock by said wait time and calling said dispatch process.

8. A system for scheduling use of system resources by a user, comprising:

a first clock;

a second clock;

a dispatch process for:
if there is work to do, scheduling use of system resources to said user in dispatch priority order with other users only when said user is not in wait status; otherwise
advancing said first clock by user time; and
advancing said second clock by user time and wait time; and a wait process for:
if there is work to do, calling said dispatch process; otherwise,
timing wait time; and
if there is a user in wait status upon said wait time exceeding a predetermined value, incrementing said first clock by said wait time and calling said dispatch process.

9. The system of claim 8, further comprising:

a scheduler process for:

determining a user share for said user;
if said user share exceeds a predefined maximum allowed share, calculating a user offset based on said user share and a time slice adjusted for any overrun on a previous time slice;
calculating a new dispatch priority for said user equal to a current dispatch priority plus said user offset;
if said new dispatch priority exceeds said first clock by a function of said user offset, placing said user in wait status and calling said dispatch process; otherwise, calling said dispatch process; and said dispatch process, upon said user completing a time slice, calling said scheduler process.

10. The system of claim 9, further comprising:

said dispatch process further for:
if said user is in wait status with a limit priority within one time slice of said second clock, removing said user from limit status.

11. A method for scheduling use of system resources by a user, comprising the steps of:

maintaining a first clock;

maintaining a second clock;

during a dispatch process,
if there is work to do, scheduling use of system resources to said user in dispatch priority order with other users only when said user is not in wait status; otherwise
advancing said first clock by user time; and
advancing said second clock by user time and wait time;

during a wait process,
if there is work to do, calling said dispatch process; otherwise,
timing wait time; and
if there is a CPU in active wait status upon said wait time exceeding a predetermined value, incrementing said first clock by said wait time and calling said dispatch process;

during a scheduler process,
determining a user share for said user;
if said user share exceeds a predefined maximum allowed share, calculating a user offset based on said user share and a time slice adjusted for any overrun on a previous time slice;
calculating a new dispatch priority for said user equal to a current dispatch priority plus said user offset;
if said new dispatch priority exceeds said first clock by a function of said user offset, placing said user in wait status and calling said dispatch process; otherwise, calling said dispatch process; and during said dispatch process, upon said user completing a time slice, calling said scheduler process.

12. The method of claim 11, further comprising the steps of:

further during said dispatch process, if said user is in wait status with a limit priority within one time slice of said second clock, removing said user from limit status.

13. A system for scheduling use of system resources by a user, comprising:

a first clock;

a second clock;

a dispatch process for:
if there is work to do, scheduling use of system resources to said user in dispatch priority order with other users only when said user is not in wait status; otherwise
advancing said first clock by user time; and
advancing said second clock by user time and wait time; and a wait process for:
if there is work to do, calling said dispatch process; otherwise,
timing wait time;
if there is a user in wait status upon said wait time exceeding a predetermined value, incrementing said first clock by said wait time and calling said dispatch process;

a scheduler process for:
determining a user share for said user;
if said user share exceeds a predefined maximum allowed share, calculating a user offset based on said user share and a time slice adjusted for any overrun on a previous time slice;
calculating a new dispatch priority for said user equal to a current dispatch priority plus said user offset;
if said new dispatch priority exceeds said first clock by a function of said user offset, placing said user in wait status and calling said dispatch process; otherwise, calling said dispatch process; and said dispatch process, upon said user completing a time slice, calling said scheduler process.

14. The system of claim 13, further comprising:

said dispatch process further for:
if said user is in wait status with a limit priority within one time slice of said second clock, removing said user from limit status.

* * * * *